US008667476B1

(12) United States Patent
Jung

(10) Patent No.: US 8,667,476 B1
(45) Date of Patent: Mar. 4, 2014

(54) INSTRUCTION GROUPING AND UNGROUPING APPARATUS AND METHOD FOR AN ADAPTIVE MICROPROCESSOR SYSTEM

(75) Inventor: Yong-Kyu Jung, College Station, TX (US)

(73) Assignee: Adaptmicrosys LLC, Erie, PA (US)

( * ) Notice: Subject to any disclaimer, the term of this patent is extended or adjusted under 35 U.S.C. 154(b) by 1094 days.

(21) Appl. No.: 12/652,764

(22) Filed: Jan. 6, 2010

Related U.S. Application Data

(60) Provisional application No. 61/145,780, filed on Jan. 20, 2009.

(51) Int. Cl.
G06F 9/45 (2006.01)

(52) U.S. Cl.
USPC .......................... 717/149; 717/140; 717/143

(58) Field of Classification Search
USPC .................................. 717/140–143, 149–151
See application file for complete search history.

(56) References Cited

U.S. PATENT DOCUMENTS

| 5,509,130 | A | | 4/1996 | Trauben | |
|---|---|---|---|---|---|
| 5,768,594 | A | * | 6/1998 | Blelloch et al. | 717/149 |
| 6,047,368 | A | | 4/2000 | Arya | |
| 6,167,536 | A | | 12/2000 | Mann | |
| 6,964,043 | B2 | * | 11/2005 | Wu et al. | 717/159 |
| 7,111,283 | B2 | * | 9/2006 | Fraser et al. | 717/136 |
| 7,181,597 | B2 | | 2/2007 | Miller | |
| 7,269,715 | B2 | | 9/2007 | Le | |
| 7,577,947 | B2 | * | 8/2009 | Subramoney et al. | 717/151 |
| 7,703,085 | B2 | * | 4/2010 | Poznanovic et al. | 717/140 |
| 7,797,691 | B2 | * | 9/2010 | Cockx et al. | 717/155 |
| 7,849,387 | B2 | * | 12/2010 | Biswas et al. | 714/799 |
| 7,937,694 | B2 | * | 5/2011 | Meijer et al. | 717/151 |
| 7,996,827 | B2 | * | 8/2011 | Vorbach et al. | 717/149 |
| 8,010,953 | B2 | * | 8/2011 | Gschwind | 717/149 |
| 8,046,752 | B2 | * | 10/2011 | Chilimbi et al. | 717/158 |
| 8,091,078 | B2 | * | 1/2012 | Brokenshire et al. | 717/143 |
| 8,095,920 | B2 | * | 1/2012 | Liao et al. | 717/140 |
| 8,099,721 | B2 | * | 1/2012 | Miceli | 717/141 |
| 8,108,848 | B2 | * | 1/2012 | Meijer et al. | 717/151 |
| 8,181,168 | B1 | * | 5/2012 | Lee et al. | 717/149 |
| 8,219,981 | B2 | * | 7/2012 | Aguilar et al. | 717/149 |
| 8,276,131 | B2 | * | 9/2012 | Langman et al. | 717/148 |
| 8,402,447 | B2 | * | 3/2013 | Duffy et al. | 717/136 |
| 8,448,155 | B2 | * | 5/2013 | Bordelon et al. | 717/149 |

OTHER PUBLICATIONS

Martin et al, "Combined Dynamic Voltage Scaling and Adaptive Body Biasing for Lower Power Microprocessors under Dynamic Workloads", IEEE, pp. 721-725, 2002.*

(Continued)

Primary Examiner — Anil Khatri
(74) Attorney, Agent, or Firm — Robert M. Bauer; Knox McLaughlin Gornall & Sennett

(57) ABSTRACT

Multiple instructions including branch instructions are grouped into a condensed variable length instruction. A trimmed and grouped branch instruction branches to one of the instructions in the same group. Therefore, a grouped instruction including branch(es) inherently executes correct branch behaviors without deploying any branch prediction schemes. In addition, a grouped instruction in a condensed form delivers multiple operations to execute without fetching all of the instructions grouped separately from the instruction memory via its caches while conserving instruction memory and/or cache as well as decreasing the number of bit switching on the bus. Software developers can make their own compatible, compact and ciphered instruction sets after grouping existing instructions in their software compiled with existing software compilers and the associated microprocessors.

19 Claims, 7 Drawing Sheets

(56) References Cited

OTHER PUBLICATIONS

Buyutosunoglu et al, "A Circuit Level Implementation of an Adaptive Issue for Power-Aware Microprocessors", ACM, pp. 73-78, 2001.*

Badea et al, "A Simplified Java Bytecode Compilation System for Resource-Constrained Embedded Processors" ACM, pp. 218-227, 2007.*

Hardnett et al, "Compiler Optimization of Embedded Applications for an Adaptive SoC Architecture", ACM , pp. 312-322, 2006.*

* cited by examiner

Four different branch-trimming and instruction grouping (BTIG) operations: D-1 to D-4

INSTRUCTION GROUPING AND UNGROUPING APPARATUS AND METHOD FOR AN ADAPTIVE MICROPROCESSOR SYSTEM

TECHNICAL FIELD OF THE DISCLOSURE

The invention relates to the alleviation of flow control or branch instruction penalties for improving the computing throughput of the software program (i.e., assembly and/or machine language program) executed by microprocessors that can sequentially fetch both of the non-grouped and the grouped instructions in the software program and adaptively ungroup and execute the micro-operations of the non-grouped and the grouped instructions in a parallel and sequential manner. The invention also relates to the conversion of the software program to the branch-trimmed, shortened and compatible program that allows the adaptive microprocessor to keep executing the operations of the non-grouped and the grouped instructions including the branch-trimmed instructions from the software program. In particular, the invention relates to the removal of branch instructions from the software program by grouping branch instructions with other single and/or multiple instructions into a compact and ciphered instruction as a branch-trimmed and grouped instruction before runtime. The invention also relates to grouping consecutive non-branch instructions into a similar compact and ciphered instruction as a grouped instruction during the adaptive compilation time, which is after software compilation and before runtime. Additionally, the invention relates to the deliverance of equal and/or improved throughputs of the software rewritten with the branch-trimmed and/or grouped instructions that provide equivalent or improved sequences of internal micro-operations of the instructions. The invention relates to the compatibility of the software, the reduction of the instruction memory including cache memory, and the saving of the operational energy consumption. The invention also relates to the software security for preventing malicious and illegal copying of software programs. More specifically, the invention relates to the hardware parts that are able to identify and decode both of the non-grouped and grouped instructions differently. The invention also relates to generating sequences of control words and extracting decoding information of the non-grouped instructions through the decoding hardware as well as to fetching the pre-decoded sequences of control words and decoding information of the grouped instructions from the instruction memory system without the decoding operation of the grouped instructions. These hardware parts can be implemented by using reconfigurable devices, such as field-programmable gate array (FPGA). The same or similar hardware parts can also be fabricated in the form of application-specific integrated circuit (ASIC). As a result, a compatible, compact, and ciphered instruction set is generated for converting existing software programs written in different instruction sets during the instruction grouping operation including the branch-trimming operation before runtime. The branch-trimmed and/or grouped software is executed by the microprocessor integrated with the invented hardware parts that make the microprocessor become an adaptive microprocessor. Therefore, the same adaptive microprocessor continues to be used for the software developed later by employing the invented branch-trimming, grouping and ungrouping apparatus.

BACKGROUND OF THE DISCLOSURE

The present invention relates generally to instruction grouping, and instruction and micro-operation level parallelism, and more specifically, it relates to an Instruction Grouping and Ungrouping Apparatus and Method for an Adaptive Microprocessor System to resolve or lighten the cost of branch penalty, save cache memory and operating energy, tolerate memory latency, and improve the performance of the adaptive microprocessor system. The Instruction Grouping and Ungrouping Apparatus and Method for an Adaptive Microprocessor System identifies the qualified instruction segments for grouping. In the invention, a non-grouped instruction is an instruction that does not satisfy the conditions to be an element of the qualified instruction segment. The Instruction Grouping and Ungrouping Apparatus and Method for an Adaptive Microprocessor System eliminates the number of branch instruction appearances; groups the branch instructions with non-branch instructions; combines non-branch consecutive instructions; and converts the qualified instruction segments to user-defined compact formats of instructions before runtime or at adaptive compilation time. In addition, the Instruction Grouping and Ungrouping Apparatus and Method for an Adaptive Microprocessor System executes both the non-grouped and the grouped instructions to achieve functional compatibility and performance enhancements by adaptively ungrouping and executing the non-grouped and the grouped instructions at runtime. Therefore, the Instruction Grouping and Ungrouping Apparatus and Method for an Adaptive Microprocessor System drastically reduces and ciphers software code while maintaining the compatibility of the software code. Furthermore, the Instruction Grouping and Ungrouping Apparatus and Method for an Adaptive Microprocessor System considerably conserves instruction cache memory or simplifies the cache organization from the hierarchical instruction memory without employing any binary compression hardware/software and instruction translation/packing techniques present in prior arts. Additionally, the Instruction Grouping and Ungrouping Apparatus and Method for an Adaptive Microprocessor System drops the signal switching frequency per unit time (i.e., second) to save operational energy as fewer instructions are fetched from memory to microprocessor via a bus in the same unit time. Since more operations, including branches, are grouped into an instruction, a cheap, slow memory system can be used continuously in fast microprocessors without causing any performance bottleneck. The Instruction Grouping and Ungrouping Apparatus and Method for an Adaptive Microprocessor System also provides functional compatibility by using adaptive hardware integrated to various back-end processing engines. Through this invention, software developers can have their own compatible, compact and ciphered instruction sets after performing the invented apparatus and method with existing software compilers and the target adaptive microprocessor systems.

PROBLEMS OF THE ART

Three basic performance detractors—cache miss rate, branch misprediction, and instruction access time—are identified in [1]. Traditionally, compilers optimize software codes to alleviate performance degradation related to detractors. This static software code optimization and related techniques—i.e., software pipelining [2, 3]—are introduced to reduce the burden of hardware. In contrast, dynamic binary translation-based approaches optimize binary software codes at runtime [4, 5]. A dynamic code optimization approach [6] employs code generation at load-time and continuous source-code optimization at runtime for optimally matching software with hardware while improving instruction-level parallelism.

Instruction-set processors have evolved as well to mitigate the memory bandwidth problems. Inherently, von Neumann-based processors provide extreme flexibility with software programmed in the procedural manner after fabrication. Binary software is stored to instruction memories (e.g., ROMs) and fetched to the processors via fast cache memories. Due to flow controls in the nature of temporal software, instruction streams are often disturbed. Pipelined architectures, including superscalar and very-long instruction word (VLIW), increase the difficulty of handling such flow control issues by paying fewer penalties while simultaneously processing multiple instructions in the pipeline. In order to reduce these flow control penalties, microprocessors need to know the direction and target address of the next instruction so that software (e.g., compiler) designers can foresee the flow of instruction streams before runtime. Thus, designers continuously develop branch prediction techniques [7, 8] and fetch engines [9] to address the ongoing penalty problem.

To provide sufficient visibility in instruction-fetch architectures, a block-aware instruction-set architecture (BLISS) [1] was introduced to facilitate flow control prediction. Basic block descriptors provide the types of flow control operations, such as the basic block termination, potential target instructions and so on. These block descriptors not only eliminate instruction-cache latency from the critical path of accurate prediction but also offer a flexible mechanism for further improvements in program code density, power reduction, and hardware complexity. In contrast to prior arts, the invention significantly alleviates the judicious use of fetch engines such as branch predictors, because a group of the qualified flow control instructions is already removed from the assembly program; a group of the known-target flow control instructions is efficiently handled by fetching branch target instruction before determining the branch operation without using a branch predictor; and the other flow control instructions, such as unknown-target branches, are still treated for lowering the branch miss cost by deciding branch operation at the earlier pipeline stage, like the instruction decoder, than at the execution stage in typical pipelined microprocessors.

U.S. Pat. No. 5,509,130 [10] describes grouping and issuing instructions simultaneously per clock cycle for execution. An instruction queue stores sequential instructions of a program and branch target instruction(s) of the program, fetched from the instruction cache. The instruction control unit decodes the sequential instructions, detects operands cascading from instruction to instruction, and groups instructions according to a number of exclusion rules which reflect the resource characteristics and the processor structure. This approach, however, groups instructions after fetching sequential instructions from the instruction cache. Therefore, it still requires maintaining at least the same size of the instruction cache. It also requires involving branch prediction and resolution hardware units for branch instructions because of grouping at runtime. Consequently, the instruction cache, branch prediction and resolution-related hardware cannot be reduced.

U.S. Pat. No. 6,047,368 [11] claims that an instruction grouping apparatus employs a compatibility circuit including translation and grouper circuits where the translation and grouper circuits, respectively, transform old instructions to new instructions as simpler forms and group instructions based on instruction type by hardware when transferring a cache line from the memory to instruction cache. In order to identify a grouped instruction, the invention [11] deploys identifiers for groups and functionality during translation. Although the dynamically grouping and identifying assigned functionalities of the grouped instructions issue and execute concurrently, this approach focuses only on increasing instruction level parallelism while paying additional hardware cost. Unlike the branch-trimming and grouping apparatus, U.S. Pat. No. 6,047,368[11] does not physically reduce the bit-length of instructions. Therefore, this approach still requires at least the same or more instruction cache, which causes the same or more energy consumption.

U.S. Pat. No. 7,269,715 [12] presents an improved method and apparatus for grouping instructions processed in the same sized instruction sets. This approach identifies a current set of instructions received as part of a group including a prior set of instructions using a history data structure. In addition, this approach recognizes a critical path or bottleneck to break apart incoming instructions into special groups or formations during the instruction fetch between a secondary memory and the instruction cache. The grouped or reformatted instructions with a grouping indication are issued to the execution units. This approach requires additional hardware, such as grouper circuit and translation circuit.

A trace cache [13] is presented that contains decoding information of the instructions consecutively executed before. In order to achieve higher throughput from superscalar processors, fetching multiple basic blocks per cycle becomes necessary. In addition, conventional instruction cache memories hinder the multiple-block fetching per cycle because instructions in the blocks are not always in contiguous locations in the cache memories. The trace cache supplements conventional instruction cache by dynamically tracing instruction stream and contiguously locating the instructions. The trace cache directly passes the decoding information when the same instruction stream is decoded. Consequently, performance enhancement and high bandwidth instruction fetching can be achieved with the trace cache. However, this approach heavily relies on the capability of employing branch prediction hardware for performance improvement. Unlike the presented branch-trimming and grouping invention, the trace cache approach cannot hold all of the traces of the multiple blocks without increasing the trace cache size. Furthermore, this approach must redecode and keep the trace of the decoded results of the instruction block if the trace of the same block is changed.

U.S. Pat. No. 6,167,536 [14] presents an on-chip instruction trace cache capable of providing information for reconstructing instruction execution flow. In particular, U.S. Pat. No. 6,167,536 [14] presents the instructions that disrupt the instruction flow by branches, subroutines, and data dependencies. Therefore, this approach allows less expensive external capture hardware to be utilized and also alleviates various bandwidth and clock synchronization issues confronting many existing solutions.

U.S. Pat. No. 7,181,597 [15] provides enhanced performance employing a trace cache. In particular, this approach decodes the first instruction into a plurality of operations with a decoder. The decoder passes the first copy of the operations to a build engine associated with a trace cache. In addition, the decoder directly passes the second copy of the operation to a back end allocation module in a decoder. This approach for enhances performance by selectively bypassing a trace cache build engine.

One of the viable approaches to improving the performance of a microprocessor is increasing the concurrent and speculative execution of multiple and/or grouped instructions. This high instruction level parallelism can be achieved by eliminating or reducing data and/or control flow constraints. Data flow is caused by insufficient resources and parallel execution of instructions. In contrast, unpredictable branch instructions cause control flow problems. Removing data/control flow problems permits formatting larger blocks of instructions to achieve higher instruction level parallelism. Typically, adding more hardware recourses, such as functional units and register files, with non-blocking caches and pipelined functional units alleviates data flow restrictions. Speculative execution and software pipelining have been used for reducing the control flow problems.

The basic detractors no longer cause performance degradation in the adaptive microprocessor system with the branch-trimmed and grouped assembly program. Since large amounts of instructions, including branches, are grouped and converted as fewer, compact instructions, instruction cache miss rate is radically decreased. In other words, smaller cache memory can be used for better or at least equal performance. For instance, the invention groups all of the instructions in a qualified loop or a qualified subroutine with flow control instructions and converts them to a single instruction. Branch prediction, therefore, is not necessary as each converted instruction executes correct branch operations at runtime with the operations of the entire loop/subroutine enclosed. Since a branch-trimmed and grouped instruction envelops the same operations as those of all of the instructions with branches during its execution through pipelined microprocessors, each branch-trimmed and grouped instruction (e.g., a loop or a subroutine) generally takes a much longer overall execution time than the times of each instruction in a loop/subroutine before grouping. Therefore, multi-cycle instruction cache or even longer main memory access can be absorbed by grouping an ample number of instructions as a single new instruction.

An adaptive microprocessor can be constructed by integrating the adaptive front-end, consisting of the adaptive instruction pre-fetch and/or fetch unit(s) and the adaptive instruction decoder, to the back-end processing engines, which include pipelined datapaths and functional units with storages for execution results. These back-end processing engines can be a superscalar, a VLIW, or others. The instructions grouped by the invented branch-trimming and grouping apparatus precisely execute the same functions of the instructions generated by a software compiler through the adaptive microprocessor. The same combination of branch-trimmed and grouped assembly program and adaptive microprocessor achieves additional performance gain and extra energy saving because of lighter instruction traffic between the simplified, smaller memory system and the microprocessor.

SUMMARY OF THE DISCLOSURE

The invention generally relates to a multiple instruction grouping that encompasses eight major branch-trimming and grouping procedures implemented as post software compilation and instruction set composition. The invention also relates to grouped instruction execution consisting of four major hardware blocks with three subcomponents in an adaptive microprocessor illustrated in FIG. 1, FIG. 6, and FIG. 7. Three special compilations including the branch-trimming and instruction grouping operation after software compilation are shown in FIG. 2. Eight branch-trimming and grouping procedures are shown in FIG. 3 through FIG. 5. FIG. 1 illustrates hardware/software components for a microprocessor system in prior arts. The adaptive hardware components that transform the conventional microprocessor system into an adaptive microprocessor system are also summarized in FIG. 1. With executions of non-grouped and grouped instructions, a hierarchical reverse branch-trimming and ungrouping scheme and associated operations are seen in FIG. 6. Detailed ungrouping procedures of both the non-grouped and grouped instructions are explained in FIG. 7. The software components of the invention, such as adaptive back-end software and micro-architecture interactive compilations, are illustrated in FIG. 2. Interoperations of the compiled executable codes and the adaptive microprocessor system are also shown in FIG. 6. Detail branch-trimming and instruction grouping methods are demonstrated from FIG. 3 to FIG. 5.

There has thus been outlined, rather broadly, some of the features of the invention in order that the detailed description thereof may be better understood, and that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an Instruction Grouping and Ungrouping Apparatus and Method for an Adaptive Microprocessor System that improves the energy consumption, cache memory conservation and performance of microprocessor system, including the achievement of a desired branch-trimming, grouping compilation and a reverse branch-trimming and instruction grouping with possible parallel execution, for enhanced microprocessor throughput while maintaining compatibility and security of software.

Another object is to provide an Instruction Grouping and Ungrouping Apparatus and Method for an Adaptive Microprocessor System that provides an adaptive way to satisfy desired software code compactness and performance enhancements with reducing branch penalty and hardware resource requirements (i.e., memory capacity and latency).

Another object is to provide an Instruction Grouping and Ungrouping Apparatus and Method for an Adaptive Microprocessor System that utilizes streamlined execution flow in branch-trimmed software with significantly simplified conventional branch prediction schemes or the branch prediction schemes used in prior arts.

Another object is to provide an Instruction Grouping and Ungrouping Apparatus and Method for an Adaptive Microprocessor System that groups branch instruction(s) with non-branch instruction(s) in order to eliminate branch instruction(s) from the original software and to generate compatible, compact and ciphered custom form of the software for preventing malicious and illegal copying of various software programs for an adaptive microprocessor system.

Another object is to provide an Instruction Grouping and Ungrouping Apparatus and Method for an Adaptive Microprocessor System that adaptively fetches and decodes the non-grouped and the grouped instructions from the instruction memory after the microprocessor fabrication, which permits instantaneous and continuous generation and usage of the compatible, compact and ciphered custom software for various and future applications.

Another object is to provide an Instruction Grouping and Ungrouping Apparatus and Method for an Adaptive Microprocessor System that assigns functions of each non-grouped or grouped instruction to the underlying back-end processing engines via the adaptive front-end microprocessor consisting of adaptive instruction pre-fetch/fetch units and an adaptive instruction decoder.

Another object is to provide an Instruction Grouping and Ungrouping Apparatus and Method for an Adaptive Microprocessor System that executes the assigned functions in a sequential or parallel manner depending on the result of the reverse branch-trimming and instruction grouping operations.

Another object is to provide an Instruction Grouping and Ungrouping Apparatus and Method for an Adaptive Microprocessor System that uses the adaptive microprocessor to execute the branch-trimmed and/or grouped instructions and complete the evaluation and decision of branch behaviors at or immediately following the decoding of the branch instructions ungrouped and executed.

Another object is to provide an Instruction Grouping and Ungrouping Apparatus and Method for an Adaptive Microprocessor System that decodes and executes unconditional branch instructions including interrupts, which are not grouped, along with the target locations of the unconditional branch instructions without further processing after the instruction decoding.

Another object is to provide an Instruction Grouping and Ungrouping Apparatus and Method for an Adaptive Microprocessor System that allows fetching the instruction following the branch-trimmed and/or grouped instruction, which contains a single and/or multiple branch instruction(s), as soon as the current instruction is decoded without any branch prediction and similar hardware and operations.

Another object is to provide an Instruction Grouping and Ungrouping Apparatus and Method for an Adaptive Microprocessor System that reduces the branch misprediction penalty, improves the overall performance of the software and saves branch prediction hardware cost.

Another object is to provide an Instruction Grouping and Ungrouping Apparatus and Method for an Adaptive Microprocessor System that permits grouping blocks of the non-branch instructions during compilation (or before runtime) and directly fetching and executing the grouped instructions without the same instruction decoding used for the non-grouped instructions at runtime.

Another object is to provide an Instruction Grouping and Ungrouping Apparatus and Method for an Adaptive Microprocessor System that can be flexibly implemented as a form of hardware in reconfigurable (e.g., field-programmable gate array (FPGA)) or application-specific integrated circuit (ASIC) with associated adaptive back-end software compilers for the branch-trimming and/or grouping compilations.

Another object is to provide an Instruction Grouping and Ungrouping Apparatus and Method for an Adaptive Microprocessor System that adequately executes all of the operations in the correct methods and orders within a desired time by a combination of the parallel and sequential micro-operations with the various conventional back-end processing engines.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called, however, to the fact that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as it becomes better understood when considered in conjunction with the accompanying drawings, in which like reference characters designate the same or similar parts throughout the several views, and wherein:

FIG. 1 is a block diagram description of a conventional microprocessor system including associated software compilation and the Instruction Grouping and Ungrouping Apparatus and Method for an Adaptive Microprocessor System. FIG. 1 illustrates the components and organization of the two different microprocessor systems. The conventional microprocessor system shown in FIG. 1 has two major components—software compilation, and hardware microprocessor and memory system. In the software compilation, four subcomponents are described. Application programs 3 are written in high-level programming languages such as C, C++, and so on. The application programs are compiled using the target software compiler 2. This compiler is typically developed by referencing the target instruction set architecture (ISA) 4. The output of the software compiler 2 is an executable object code in binary form 1 consisting of only the instructions defined in the target ISA 4.

Figure 1:
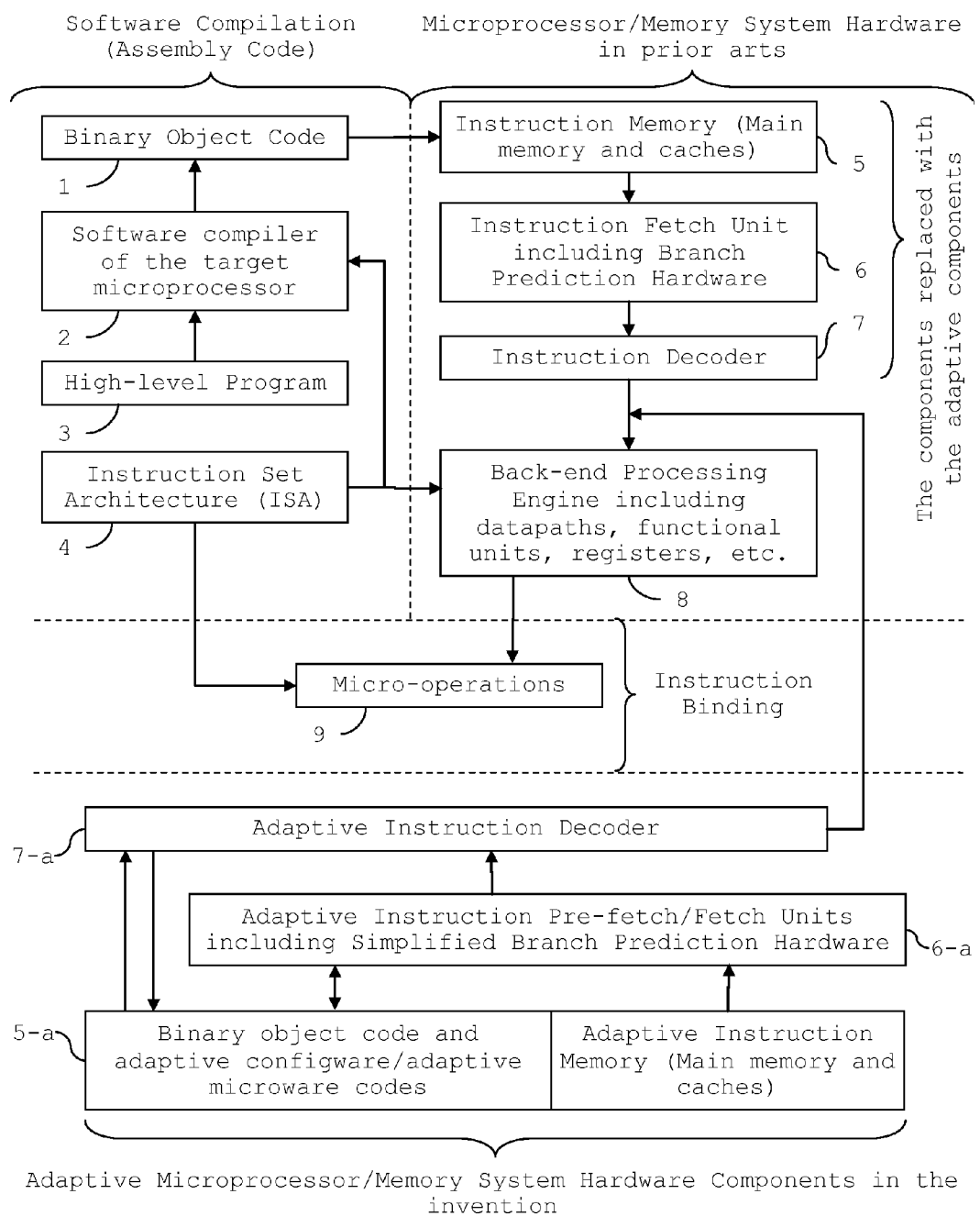
FIG. 1.

The binary object code or binary instruction 1 is stored into the instruction memory 5. Instruction memory 5 generally consists of the slow and large main instruction memory and small and fast cache memories. Smaller and faster cache memories are located between the main instruction memory and the front-end of the microprocessor. A conventional microprocessor consists of an instruction fetch unit 6 and an instruction decoder 7 and back-end processing engines 8. The instruction fetch unit 6 typically contains instruction queues, branch prediction logic, and other hardware. The instruction decoder 7 decodes the binary instruction fetched through the instruction fetch unit 6 and produces control words and extracts information from the binary instruction decoded. Output of the instruction decoder 7 is fed to the back-end processing engines 8, which consist of datapaths, functional units, register files, and other hardware resources. The instructions defined in ISA 4 can be bound to designated micro-operations 9 that execute the function of the instructions. The micro-operations are typically designed while developing the back-end processing engines of the microprocessor.

On the other hand, an adaptive microprocessor can be created by replacing the components (i.e., 5, 6, and 7) in the front-end microprocessor with the adaptive front-end components (i.e., 5-a, 6-a, and 7-a). As seen in FIG. 1, the adaptive front-end microprocessor consists of the adaptive instruction prefetch and fetch units with simplified branch prediction logic hardware 6-a and the adaptive instruction decoder 7-a. Although the instruction pre-fetch and the branch prediction are not necessary, those components can be useful in obtaining an additional performance enhancement. The adaptive instruction memory 5-a stores binary object code and other special executable codes, such as adaptive configware and adaptive microware codes, in an adaptive microprocessor system. The adaptive configware is for decoding the instructions including the branch-trimmed and/or grouped instructions. The adaptive microware is for binding new branch-trimmed and/or grouped instructions to already implemented micro-operations in the back-end processing engines 8. These two micro-architecture interactive compilation codes are also stored to the adaptive instruction memory 5-a.

The adaptive microprocessor shown in FIG. 1 is able to fetch, decode and execute both the non-grouped existing instructions and instantaneously grouped instructions, such as branch-trimmed and grouped instructions, before runtime.

Binary instructions 1 are fetched from the adaptive instruction memory 5-*a* after loading the adaptive configware code at a different location in the same adaptive instruction memory 5-*a*. The adaptive instruction pre-fetch/fetch units, including simplified branch prediction logic hardware 6-*a* and the adaptive instruction decoder 7-*a*, access the adaptive microware code of the branch target instructions in the instruction cache of the adaptive instruction memory 5-*a*. The adaptive instruction pre-fetch/fetch units 6-*a* fetch two different types of instructions—non-grouped and grouped instructions. When decoding a non-grouped instruction, which is the same instruction defined in the target ISA, the adaptive instruction decoder 7-*a* decodes the instruction through the decoding logic hardware configured by the associated adaptive configware code. The adaptive instruction decoder 7-*a* produces control words and decoding information as decoding outputs. The control words are signals used for enabling datapaths, functional units, and other hardware components in the back-end processing engines 8. The decoding information extracted from the decoded instruction, which includes addresses of register files, immediate data, and other information necessary for executing the instruction with the control words. On the other hand, the adaptive instruction decoder 7-*a* only identifies branch-trimmed and grouped instructions and directly obtains the decoding output by accessing the microware codes of the grouped instruction from the adaptive instruction memory 5-*a* via the instruction per-fetch/fetch units 6-*a* without performing the decoding operations that are usually performed for decoding the ungrouped instructions. The adaptive micro-operations of each instruction in the grouped instructions are continuously accessed until the last instruction in the grouped instruction is completed.

Figure 2:
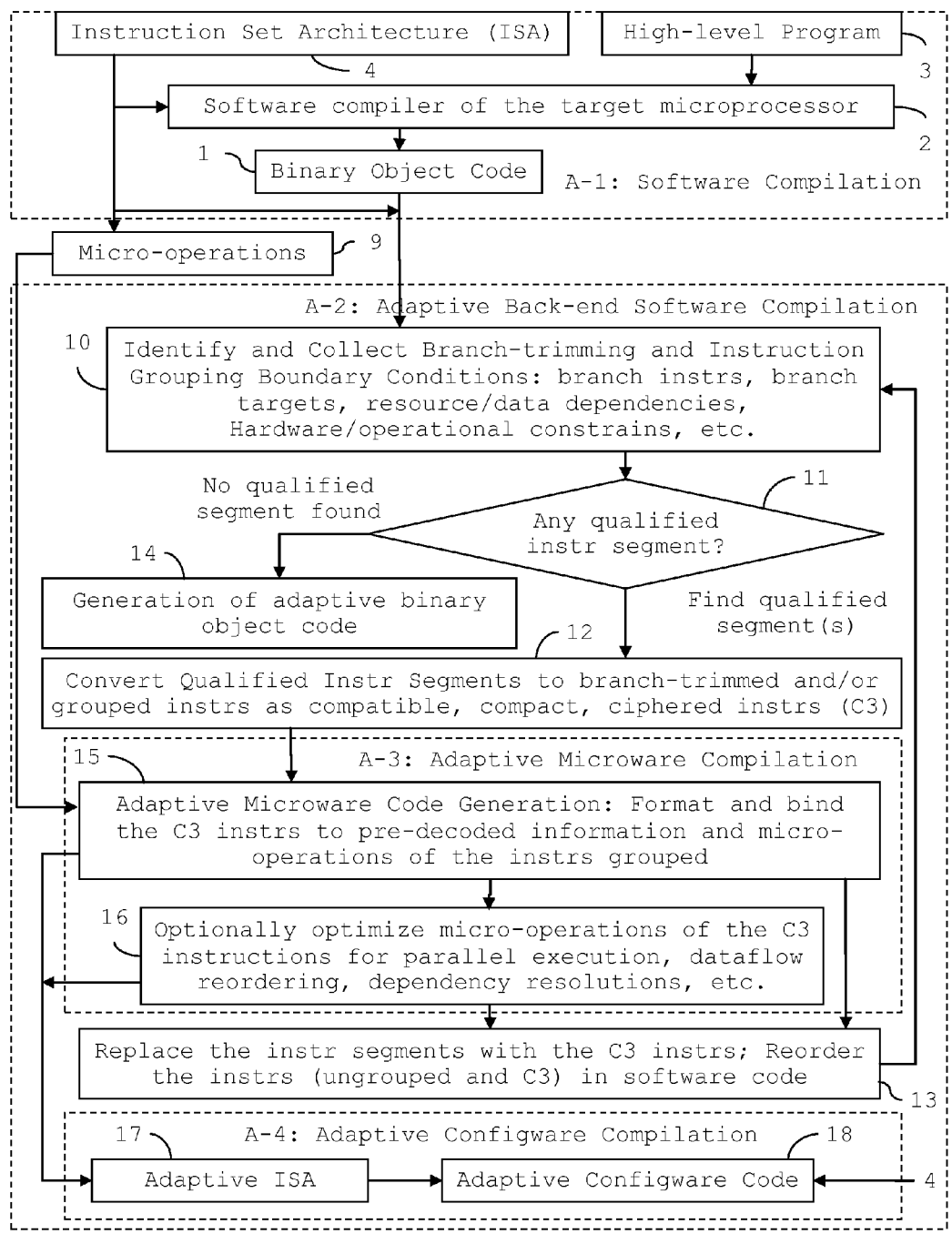

FIG. 2: FIG. 2 illustrates an adaptive back-end software compilation procedure and two micro-architecture interactive compilation—an adaptive microware compilation A-3 and an adaptive configware compilation A-4—procedures for the invention in detail. The adaptive back-end software compilation A-2 performs branch-trimming and instruction grouping compilation of the input software (i.e., assembly and/or binary object codes). The adaptive back-end software compilation A-2 outputs branch-trimmed and grouped assembly/binary object codes as adaptive binary object code 14 and produces an input for the adaptive microware compilation A-3, which formats new instructions created and used for the adaptive binary object code 14 as well as binds the new instructions, such as branch-trimmed and/or grouped instructions, to the micro-operations and the pre-decoded information. After the adaptive microware compilation A-3, each of the instruction segments that qualified for branch-trimming and/or grouping is replaced with a compatible, compact, ciphered (C3) instruction, which has a different binary format that is not defined in the original ISA 4.

The adaptive microware compilation A-3 also optionally optimizes micro-operations of multiple instructions grouped in a C3 instruction. For instance, instruction-level and micro-operation-level parallelisms (ILP/MLP) are explored for performance enhancement. In addition, reordering of instructions and micro-operations according to the dataflow can be fulfilled for additional performance improvement. Any dependencies, such as data, output, and resource dependencies, can be resolved if possible. The results of the adaptive microware compilation A-3 are forwarded to the adaptive configware compilation A-4 for decoding the C3 instructions defined in the adaptive ISA 17 and the non-grouped instructions defined in the original ISA 4 via the adaptive instruction decoder 7-*a*. Once the final adaptive binary object code 14 is generated from the adaptive back-end software compilation A-2, the adaptive ISA 17 is completed. The adaptive ISA contains all of the C3 instructions created through the adaptive back-end software compilation A-2 and the instructions used by the software compilation A-1.

The adaptive back-end software compilation A-2 is a recursive procedure. A cycle of the adaptive back-end software compilation A-2 carries out the following sub-operations: (1) identification and collection of qualified instruction segments 10 from the software binary object code 1. From all of the branch instructions, the associated branch target instructions are identified and used for qualifying the instruction segments. Any data and resource dependencies and operational and structural constraints are also identified and collected for the same purpose; (2) instructions within a qualified instruction segment, except for the instruction at the beginning location, must not branch to and become branch targets from outside of the instruction segment. Once an instruction segment is grouped, the grouped instruction can be an instruction of another instruction segment for further instruction grouping. Detailed branch-trimming and instruction grouping rules and conditions are described from FIG. 3 to FIG. 5; (3) an adaptive binary object code 14 is generated if any qualified instruction segment is not found; (4) otherwise, the branch-trimming and instruction grouping qualification procedure 11 initiates the next C3 instruction conversion procedure 12 that converts qualified instruction segments to associated C3 instructions. The output of the conversion procedure 12 is passed to the adaptive microware compilation A-3; and (5) an adaptive back-end software transformation procedure 13 replaces the qualified instruction segments with the C3 instructions formatted and bound by the adaptive microware compilation A-3 and reorders the entire instructions with the new addresses calculated.

One of the micro-architecture interactive compilations is the adaptive microware compilation A-3, which formats and binds the C3 instructions to the micro-operations already implemented in the target back-end processing engines 8. The adaptive microware compilation A-3 generates two types of the adaptive microware code outputs—(1) micro-operation sequences and pre-decoded information of the C3 instructions and (2) hierarchical instruction binding information that links the C3 instructions to the micro-operations of the instructions in the grouped instructions—via its mandatory procedure 15. The adaptive microware codes also contain the instruction binding information of the non-grouped instructions. Therefore, the adaptive instruction decoder 7-*a* is able to generate and pass its decoding outputs to the back-end processing engines 8 regardless of whether the instructions are bound before or after fabrication of the microprocessor. In prior arts, instruction binding must be completed before the microprocessor fabrication. As an optional microware compilation procedure 16, the C3 instructions are further processed for improving the adaptive microprocessor performance. For instance, the optional procedure 16 rearranges the execution order of the micro-operations of the C3 instructions for parallel execution at the micro-operation level. The same procedure 16 reorders the micro-operations based on the dataflow of the internal micro-operations of the C3 instructions. This can eliminate unnecessary micro-operations related to temporary data store and load operations. This optional procedure 16 also performs dependency resolution operations at the micro-operation level, which is not possible in the prior arts.

Another micro-architecture interactive compilation is adaptive configware compilation A-4 for decoding entire non-grouped and grouped instructions by employing the adaptive instruction decoder **7-*a*. The adaptive configware compilation A-4 uses the original ISA 4 and the adaptive ISA 17 for decoding non-grouped and grouped (e.g., C3) instructions, respectively. The adaptive configware compilation A-4 generates an adaptive configware code that concurrently executes when the adaptive instruction decoder 7-*a* decodes instructions, especially for identifying the C3 instructions. Composing an adaptive ISA 17 is another major procedure in the adaptive configware compilation A-4. The adaptive ISA consists of non-grouped and grouped instructions used in the adaptive binary object code 14, which is generated by the last procedure of the adaptive back-end software compilation A-2. In particular, the adaptive ISA 17 produces the branch-trimmed and/or grouped instructions as C3 instructions that are completely hidden from the application programmers who generally use only the software compiler. This results in natural software code protection and compression. Adaptive configware code generation procedure 18 finally produces configuration code for the adaptive instruction decoder 7-*a***.

The adaptive instruction decoder **7-*a* also generates and delivers the instruction length of the decoded instruction to the adaptive instruction pre-fetch/fetch units 6-*a*. In particular, the adaptive instruction decoder 7-*a* identifies the C3 instructions so that it can directly access the pre-decoded outputs of the C3 instructions. Unlike conventional microprocessors, the adaptive microprocessor determines the branch and updates the program counter at the adaptive instruction decoder 7-*a*. This allows two unique advantages: (1) the branch instructions in the C3 instructions independently operate so that the trimmed branch correctly redirects the micro-operation flows of the instructions grouped without changing the program counter value if the C3 instruction grouped any branch instruction; and (2) the adaptive instruction pre-fetch/fetch units 6-*a* fetch both possible branch target instructions before the back-end processing engines 8 complete all micro-operations of the current C3 instruction. The adaptive instruction decoder 7-*a* decodes a branch instruction while the back-end processing engines 8 execute the previous instruction. Finally, the adaptive instruction decoder 7-*a* decides the branch direction as soon as the branch condition is fixed by completing the previous instruction at the back-end processing engines 8. The adaptive instruction decoder 7-*a* swiftly decodes one of the two fetched instructions as the current instruction, which is pointed by the program counter in the adaptive instruction decoder 7-*a*. This reduces branch miss prediction penalty with a simplified branch prediction logic hardware in the adaptive instruction pre-fetch/fetch units 6-*a***. In addition, the branch prediction logic hardware may not be necessary if branch instructions carry the branch target addresses.

The adaptive back-end software compilation A-2 repeats all of the procedures explained above to finally produce an adaptive binary object code 14 with generated intermediate outputs including the adaptive ISA 17 from the adaptive configware compilation A-4 and the adaptive microware code from the adaptive microware compilation A-3. This recursive compilation continues until no qualified instruction segment is found. However, this recursive compilation can also be terminated at the end of each adaptive back-end software compilation cycle.

Figure 3:
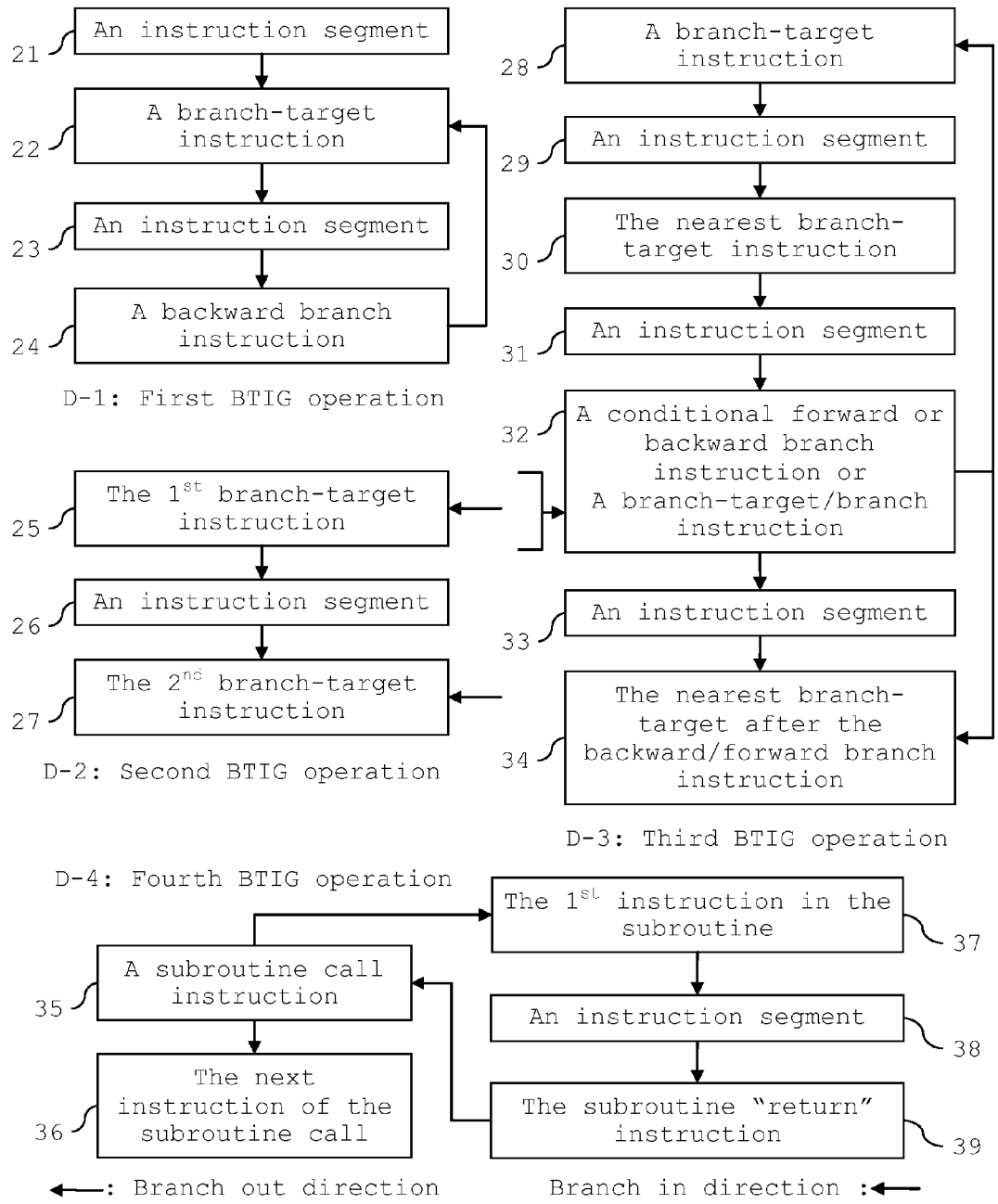
Figure 4:
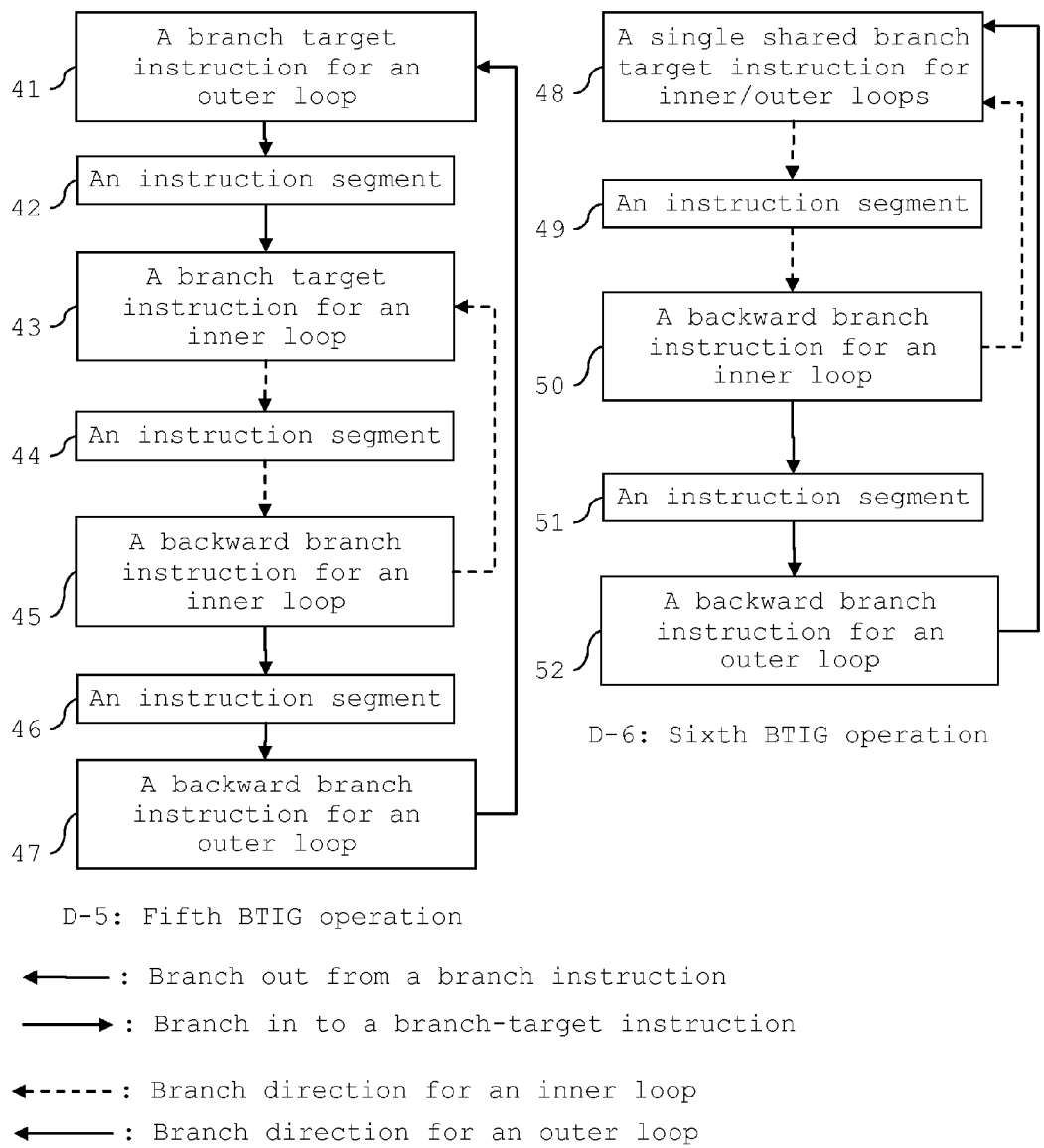
Figure 5:
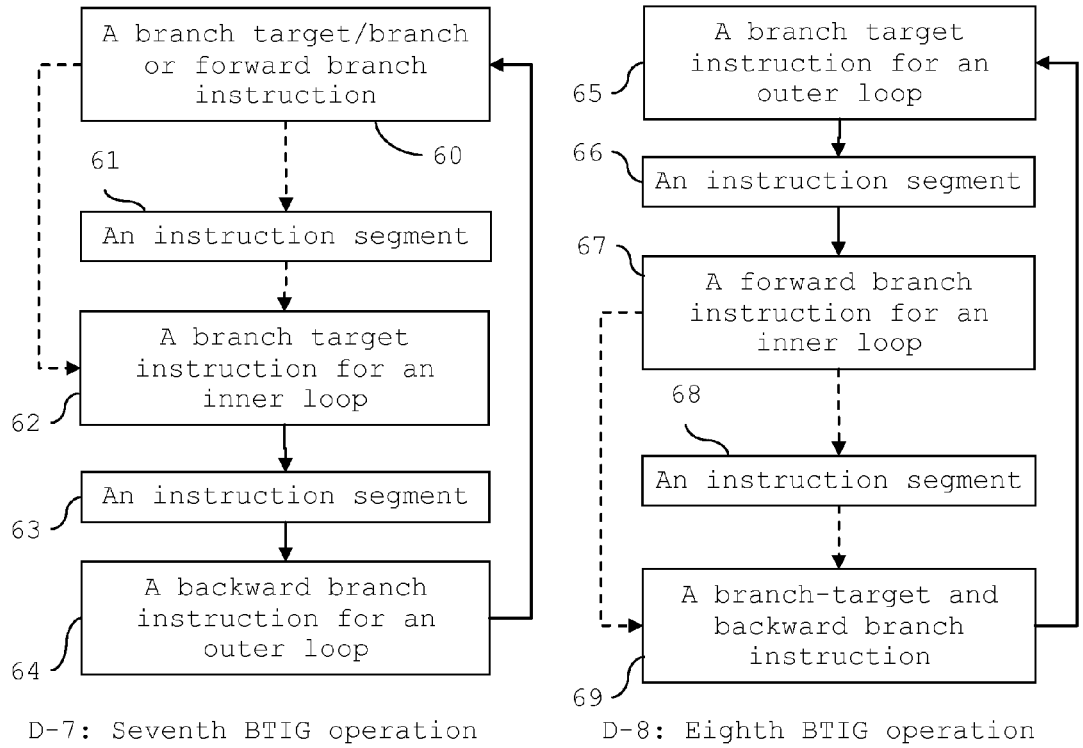

FIG. 3 to FIG. 5: FIGS. 3, 4, and 5 illustrate branch-trimming and instruction grouping (BTIG) operations invented. A primary rule for the BTIG operations is that a C3 instruction begins with a branch-target instruction and ends with the associated branch instruction or vice versa. Therefore, branch prediction is neither necessary nor has any branch penalty when executing the C3 instruction. This rule allows a single-level loop and subroutine to be grouped as a C3 instruction. A C3 instruction is considered a non-branch and non-branch-target instruction if the C3 instruction contains a branch-target instruction and the associated branch instruction. However, any other branch instruction outside of this C3 instruction must not jump to the branch-target instruction in the C3 instruction. This type of the C3 instruction can be grouped with other instructions to become another C3 instruction. If a C3 instruction starts with the branch-target instruction, the C3 instruction serves as a branch-target instruction for another BTIG operation. Based on the primary BTIG rule, few of the BTIG rules are extended. A branch-target instruction must be a start instruction of a C3 instruction. However, if there is only one branch-target instruction and no other branch or branch-target instruction in the same C3 instruction, the C3 instruction can be ended with a non-branch instruction. In this case, branch-trimming operation is not performed. A special BTIG operation rule exists for the instruction segment that can be executed independently and concurrently. This rule permits grouping instructions regardless of the branch-trimming operation.

FIG. 3: FIG. 3 is a diagrammatic depiction of the branch-trimming and instruction grouping (BTIG) apparatus of the present invention. Four BTIG operations (D-1, D-2, D-3, and D-4) are presented in FIG. 3.

The first BTIG operation D-1 groups at least three different types of instructions and instruction segments in the order as seen in FIG. 3. The first type of instruction 22 must be a branch-target instruction, which is located before its branch instruction in the instruction order. The second type of instruction or instruction segment 23 is a non-branch instruction or instruction segment that does not include any branch or branch-target instruction. However the second type of instruction or instruction segment 23 must be located after the first type of instruction 22. The third type of instruction 24 is a backward branch instruction that redirects the program order to the second type of instruction 22. The backward branch instruction 24 is trimmed when all of the three types of instructions are grouped to a C3 instruction. The branch-trimmed instruction in the C3 instruction performs a micro-branch to its branch-target instruction 22 during the execution of the C3 instruction. The fourth type of instruction or instruction segment 21 is a non-branch/non-branch-target instruction or instruction segment that does not include any branch and branch-target instruction like the second type of instruction/segment 23. The fourth type of instruction segment 21 can be grouped without any of the other three types of instructions used by the first BTIG operation D-1.

On the other hand, the three types of instructions and instruction segments 24, 23, and 22 with a forward branch instruction as the third type of the instruction 24 in reverse order are also grouped. The forward branch instruction located prior to the other first and second types of instructions is trimmed. In this case, the fourth type of instruction or instruction segment 21 can be located before the third type of instruction 24 and/or after the first type of instruction or instruction segment 22.

The second BTIG operation D-2 groups two different types of instructions and instruction segments in the order shown in FIG. 3. The first type of instruction or instruction segment 26 that does not include any branch and branch-target instruction can be located before the second branch-target instructions 27. However, the first type of instruction or instruction segment 26 is not always necessary for the second BTIG operation D-2. The second BTIG operation D-2 only groups non-branch instructions instead of trimming a branch instruction. If a branch-target instruction 25 is followed by an instruction segment 26 as seen in FIG. 3, the second BTIG operation D-2 only groups the instruction segment 26 and the second branch-target instructions 27.

The third BTIG operation D-3 distinctly groups seven different types of instructions and instruction segments in the order illustrated in FIG. 3. A branch-target instruction 30 is only grouped with the following non-branch and non-branch-target instruction segment 31, although the next instruction of the instruction segment 31 is a backward branch instruction 32 that does not jump to the nearest branch-target instruction 30 but goes to another branch-target instruction 28 located before the nearest branch-target instruction 30 from the backward branch instruction 32. If a forward branch instruction 32 jumps to the nearest branch-target instruction 34 and there is no other branch or branch-target instruction between them, the three different types of instructions 32 and 34 and instruction segments 33 are grouped by the third BTIG operation D-3. If the branch instruction 32 is a backward branch instruction or jumps to other instruction, the instruction segment 33 and the branch-target instruction 34 are only grouped. If the forward branch instruction 32 jumps to the nearest branch-target instruction 34 but the same instruction 32 is a branch-target instruction of another branch instruction, the branch instruction 32 must not be included for the third BTIG operation D-3. For instance, a branch instruction that serves as a branch and a branch-target instruction at the same time must be not grouped with any other instruction.

The fourth BTIG operation D-4 shows an instruction grouping operation for a subroutine. A subroutine-call instruction 35 jumps to the first instruction in the subroutine 37. If the subroutine does not contain a branch instruction, which jumps out to the subroutine, or a branch-target instruction, which is a destination location for a branch instruction outside the subroutine, then a subroutine can be executed independently after grouping all of the instructions in the subroutine. This single-level subroutine typically consists of non-branch and non-branch-target instructions 37 and 38 and a subroutine return instruction 39, which redirects the program order to the next instruction 36 of the subroutine-call instruction 35. The fourth BTIG operation D-4 not only removes the subroutine-return instruction, which is a branch instruction, but also groups the entire subroutine to a C3 instruction. In addition, the C3 instruction replaces the subroutine-call instruction 35, which calls the grouped subroutine.

FIG. 4: FIG. 4 is a diagrammatic depiction of the BTIG apparatus of the present invention. In particular, the BTIG operations shown in FIG. 4 are for two of the multi-loop BTIG operations (D-5 and D-6). The invented BTIG operations can recursively fulfill the achievement of additional branch-trimming and instruction grouping performance. After the single-loop BTIG operations shown in FIG. 3, the remaining non-grouped and C3 instructions are applied for the BTIG operations again. Two multi-level loop samples are shown in FIG. 4 to explain the recursive BTIG operations for the multi-level loops.

As seen in FIG. 4, a two-level loop consists of an inner loop and an outer loop. The inner loop consists of a branch-target instruction 43, a non-branch and non-branch-target instruction segment 44, which has no non-branch or non-branch-target instructions, and a branch instruction 45, which jumps back to the branch-target instruction 43. This inner loop is grouped to a C3 instruction at the first iteration of the BTIG operation as shown with dashed lines.

Since the C3 instruction grouped at the first iteration can be a non-branch and non-branch-target instruction, the outer loop consists of a branch-target instruction 41, a non-branch and non-branch-target instruction segment 42, the C3 instruction grouped at the previous BTIG operation, another non-branch and non-branch-target instruction segment 46, and a backward branch instruction 47, which jumps to the branch-target instruction 41. Both non-branch and non-branch-target instruction segments 42 and 46 are not necessary for the fifth BTIG operation D-5.

Another two-level loop for the sixth BTIG operation D-6 is shown in FIG. 4. The two-level loop consists of an inner loop and an outer loop. However, both the inner and outer loops share the same branch-target instruction 48. The inner loop consists of the shared branch-target instruction 48, a non-branch and non-branch-target instruction segment 49, and a backward branch instruction 50, which jumps to the branch-target instruction 48. This inner loop is grouped and converted to a C3 instruction. The inner loop BTIG operation is shown with dashed lines. This C3 instruction grouped at the first iteration is a non-branch and branch-target instruction. The outer loop consists of the same shared branch-target instruction 48, the C3 instruction grouped in the previous iteration of the BTIG operation, a non-branch and non-branch-target instruction segment 51, and a backward branch instruction 52, which jumps to the branch-target instruction 48.

Similar to the other single-loop BTIG operations seen in FIG. 3, a swapped order of a pair of the branch and the associated branch-target instructions is still applicable for the same multi-loop BTIG operations (D-5 and D-6). For instance, the branch-target instruction for an inner loop 43 and the backward branch instruction for the same inner loop 45 are changed to a forward branch instruction 43 and a branch-target instruction of the same inner loop 45, respectively. The fifth BTIG operation D-5 can perform the multi-loop operation and produce a C3 instruction that groups all of the instructions in the multi-loop. The other possible combinations of the multi-loops, which satisfy the BTIG rules shown in FIG. 3, can also be grouped. Unlike the fifth BTIG operation D-5, the sixth BTIG operation D-6 can be performed if the shared branch-target instruction 48 and the backward branch instruction 50 are replaced with a forward branch instruction and another forward branch instruction, respectively. Both of the forward branch instructions jump to the same branch-target instruction located after the later forward branch instruction.

Although FIG. 4 illustrates two-level loops, higher level loops can be grouped in a similar manner. Practically, higher levels of loops, such as four-level or higher loops, are rarely found in software. Therefore, the recursive BTIG operation can only be repeated two or three times. Any non-branch and non-branch-target instruction segments, such as 42, 44, 46, 49, and 51, can be omitted for the same multi-loop BTIG operations.

FIG. 5: FIG. 5 is a diagrammatic depiction of the BTIG apparatus of the present invention. In particular, the BTIG operations shown in FIG. 5 are for the other two multi-loop BTIG operations (D-7 and D-8). The seventh and eighth BTIG operations (D-7 and D-8) shown in FIG. 5 also recursively fulfill the achievement of additional branch-trimming and instruction grouping performance. Similarly, the remaining non-grouped and C3 instructions after the single-loop BTIG operations shown in FIG. 3 are also applicable for the seventh and eighth BTIG operations (D-7 and D-8) shown in FIG. 5. Two multi-level loop examples are shown in FIG. 5 to explain the recursive BTIG operations for the multi-level loops.

FIG. 5 illustrates two different two-level loops for the two different BTIG operations D-7 and D-8. One of the two-level loops consisting of an inner loop and an outer loop is for the seventh BTIG operations D-7. The inner loop consists of a branch-target and branch instruction 60, which jumps forward to the branch-target instruction 62 and serves as a branch-target instruction of another branch instruction 64, a non-branch and non-branch-target instruction segment 61, which does not have any non-branch or non-branch-target instructions, and a branch-target instruction 62. All of the instructions in the inner loop are grouped to a C3 instruction at the first iteration of the BTIG operation as shown with dashed lines. Since the C3 instruction grouped at the first iteration can serve as a non-branch and branch-target instruction, the outer loop consists of a branch-target instruction, which is the C3 instruction grouped at the previous BTIG operation, a non-branch and non-branch-target instruction segment 63, and a backward branch instruction 64, which jumps back to the same C3 instruction serving as the branch-target instruction.

Another two-level loop for the eighth BTIG operation D-8 is shown in FIG. 5. The two-level loop consists of an inner loop and an outer loop. However, an instruction at 69 operates as a branch-target instruction for an inner loop and as a backward branch instruction for an outer loop. The inner loop consists of a forward branch instruction 67, a non-branch and non-branch-target instruction segment 68, and a dual-operating branch-target and backward branch instruction 69. This inner loop is grouped and converted to a C3 instruction, which serves as a branch instruction that jumps to the branch-target instruction 65 for the outer loop BTIG operation. The inner loop BTIG operation is shown with dashed lines. The outer loop consists of a branch-target instruction 65, a non-branch and non-branch-target instruction segment 66, and the C3 instruction grouped in the previous iteration of the BTIG operation.

Although FIG. 5 illustrates two-level loops, higher level loops can be grouped in a similar manner. Since higher levels of loops, such as four-level or higher loops, are rarely found in software, the recursive BTIG operation can only be repeated two or three times. Any non-branch and non-branch-target instruction segments, such as 61, 63, 66, and 68, can be omitted for the same multi-loop BTIG operations.

Figure 6:
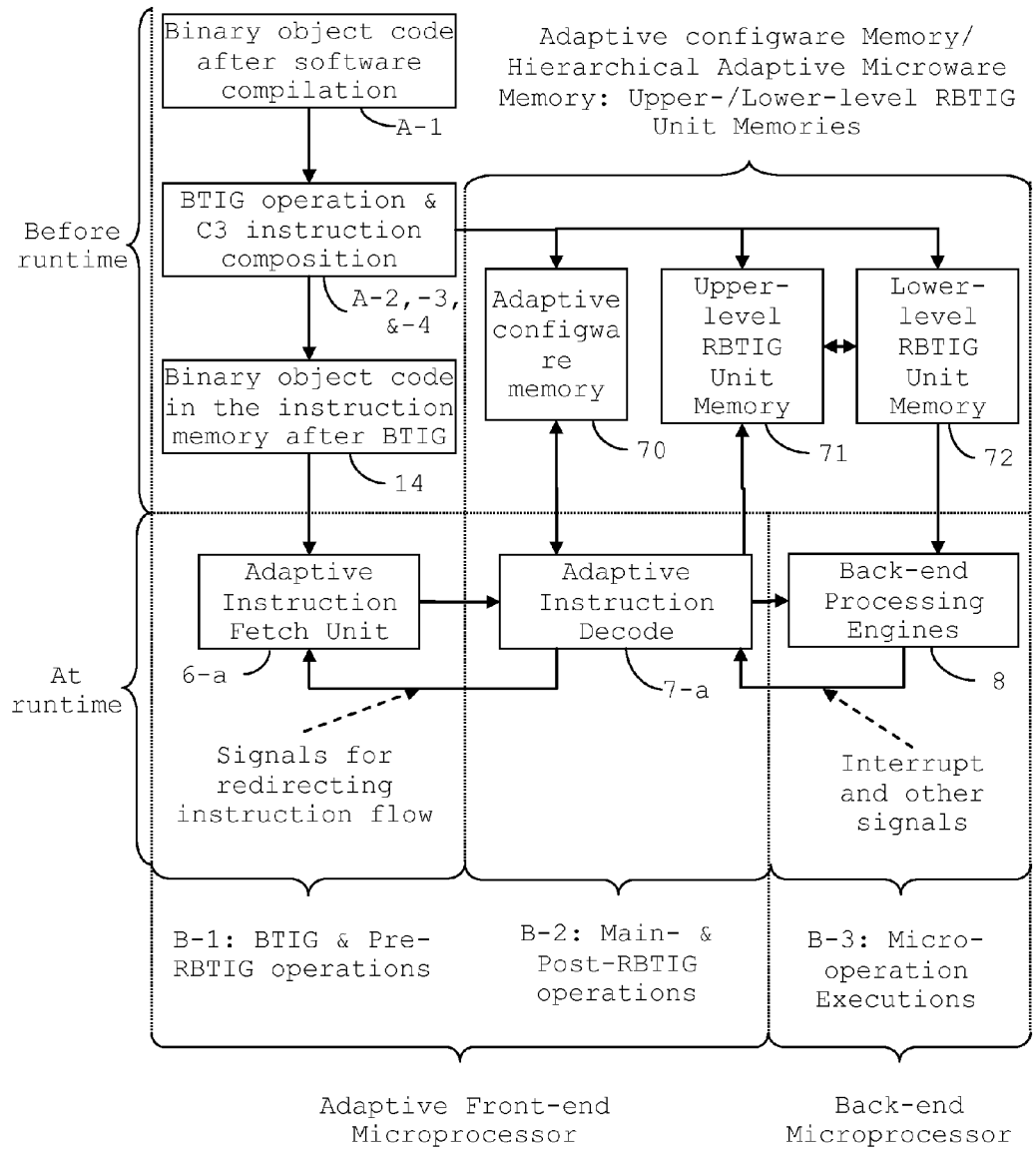

FIG. 6: FIG. 6 is a diagrammatic depiction of the branch-trimming, instruction grouping and executing apparatus of the present invention. As shown in FIG. 2, an adaptive object binary code 14 is generated after the recursive adaptive back-end software compilations A-2, including adaptive microware A-3 and adaptive configware A-4 compilations with the binary object code A-1. In particular, FIG. 6 illustrates the components and organization of the branch-trimming and instruction grouping (BTIG) operation at compile time (or before runtime), and reverse branch-trimming and instruction grouping operation at execution time (or at runtime). Three sequential forward and reverse branch-trimming and instruction grouping (RBTIG) operations are: (1) B-1 branch-trimming and instruction grouping before runtime and the pre-reverse branch-trimming and instruction grouping in the adaptive instruction pre-fetch/fetch units 6-a; (2) B-2 the main and post-reverse branch-trimming and instruction grouping at the adaptive instruction decoder 7-a including three designated memories (e.g., cache memories)—the adaptive configware memory 70, the upper-level 71 and the lower-level reverse branch-trimming and instruction grouping memories 72 in the hierarchical reverse branch-trimming and instruction grouping units; and (3) B-3 the micro-operation execution at the back-end processing engines 8.

As briefly explained in FIG. 2, the adaptive instruction decoder 7-a determines an instruction flow direction whenever decoding branch-taken instructions, which are neither trimmed nor grouped, during the main and post RBTIG operations B-2. The adaptive instruction pre-fetch/fetch units 6-a complete the instruction flow redirection by accepting one of the instructions already fetched during the pre-RBTIG operation B-1 if the branch target address of the decoded branch instruction is known. Otherwise, the simplified branch prediction logic hardware along with the adaptive instruction pre-fetch/fetch units 6-a alternatively provide the branch target address that was collected from the previously taken branch operation of the same instruction decoded. If there is not a branch-taken history, the adaptive instruction pre-fetch/fetch units 6-a must wait for the branch target address determined by the adaptive instruction decoder 7-a. Similar to the branch operation at the adaptive instruction decoder 7-a, the other operations, which also interrupt sequential instruction flow, need to inform the adaptive instruction decoder 7-a the new target address of the instruction flow. For instance, interrupt operations are detected and initiated during the micro-operation executions B-3. In order to perform dedicated interrupt service routines, the program counter in the adaptive instruction decoder 7-a must point the start location of the interrupt service routines. Consequently, the new program counter value is updated by the adaptive instruction decoder 7-a whenever instruction flow is disrupted.

The back-end processing engines 8 during the micro-operation executions B-3 consume the decoded information and micro-operation sequences of each ungrouped instruction to perform the assigned function of the instruction. The lower-level RBTIG unit memory 72 directly delivers both the pre-decoded information and micro-operation sequences of the instruction if the instruction is a part of the C3 instruction. Otherwise, the same RBTIG unit memory 72 only provides the micro-operation sequences of the instruction. The adaptive instruction decoder 7-a passes the decoded information, which is extracted from the instruction decoded, to the back-end processing engines 8. The adaptive instruction decoder 7-a also sends access information to the upper-level RBTIG unit memory 71, which also has logic hardware for guiding single or multiple micro-operation(s) of the instruction(s).

Figure 7:
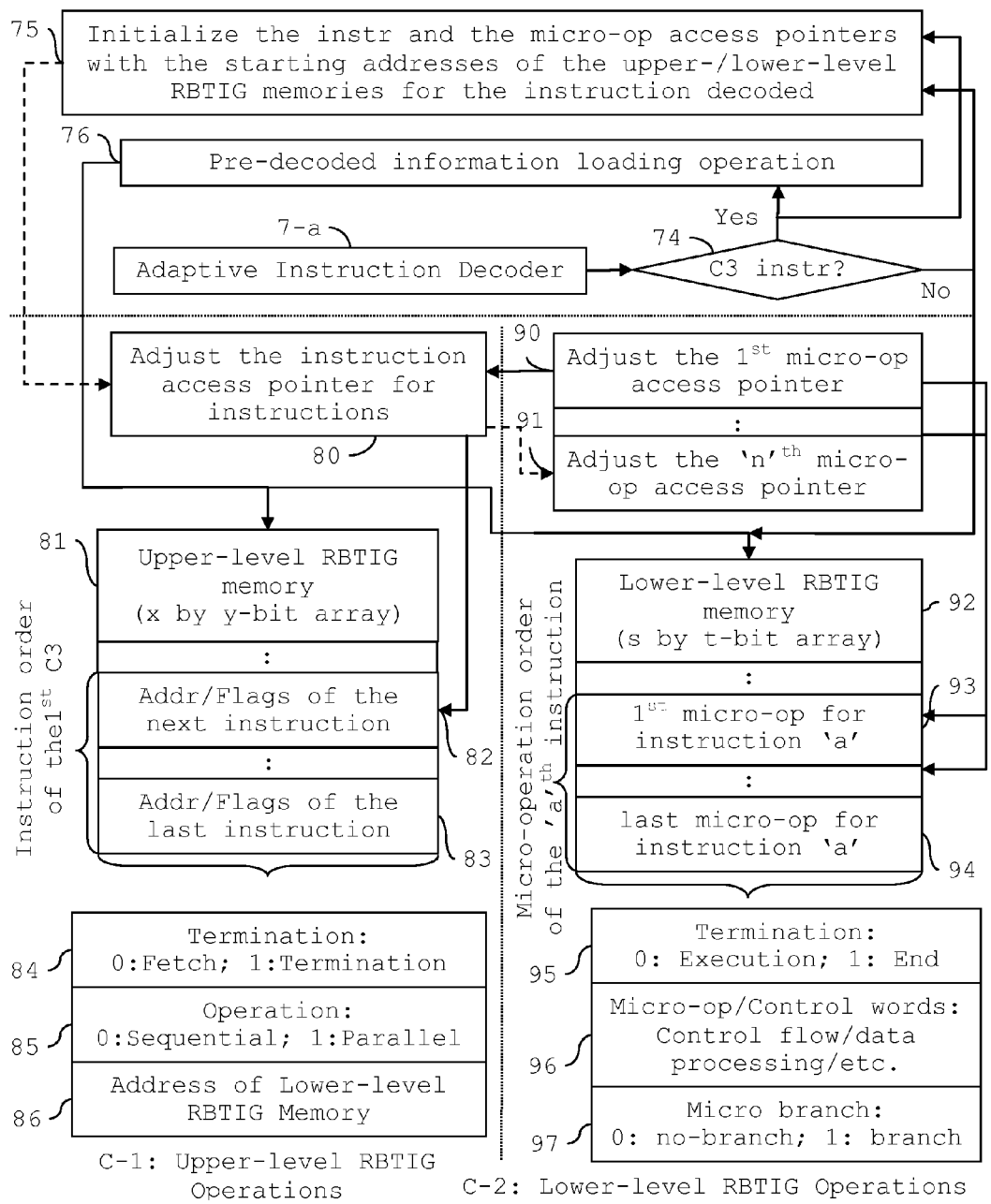

FIG. 7: FIG. 7 is a detailed diagrammatic description of the reverse branch-trimming and instruction grouping (RBTIG) apparatus of the present invention. Present are three RBTIG operations—the main and post RBTIG operations B-2, the upper-level RBTIG operations C-1, and the lower-level RBTIG operations C-2.

Detailed operational procedure of the main and post RBTIG operations B-2 is shown in FIG. 7. After the adaptive instruction decoder 7-a decodes an instruction, it is necessary to identify whether or not the instruction decoded is a C3 instruction. This C3 instruction evaluation operation 74 branches two different ways to handle the designated RBTIG operations C-1 and C-2. If the C3 instruction evaluation operation 74 results in the RBTIG operations C-1 and C-2 for C3 instruction, the pre-decoded information loading operation 76 stores the pre-decoded information delivered from the adaptive instruction pre-fetch/fetch units 6-a to the upper- and lower-level RBTIG memories 71 and 72. Otherwise, the decoded information from the adaptive instruction decoder 7-a is stored to the upper- and lower-level RBTIG memories 71 and 72. Whenever a new instruction is decoded by the adaptive instruction decoder 7-a, initialization operations 75 of both instruction and micro-operation access pointers, respectively, are initialized with the starting addresses of the upper- and lower-level RBTIG memories 71 and 72 for the instruction decoded. If a C3 instruction is decoded, the initial addresses of the upper- and lower-level RBTIG memories 71 and 72 are for the addresses of the first instruction grouped in the C3 instruction. For the non-grouped instruction, the initial addresses of the upper- and lower-level RBTIG memories 71 and 72 are for the addresses of the only non-grouped instruction.

The detailed structure of the upper-RBTIG memory unit 71 shown in FIG. 6 includes adjustment logic hardware 80 of an instruction access pointer and the upper-level RBTIG memory 81. The upper-level RBTIG memory 81 holds sequences of at least one C3 instruction to multiple C3 instructions. The lower-RBTIG memory unit 72 shown in FIG. 6 includes adjustment logic hardware 90 and 91 of the micro-operation access pointers and the lower-level RBTIG memory 92. The lower-level RBTIG memory 92 holds sequences of at least one micro-operation to multiple micro-operations. If multiple C3 instructions need to be executed concurrently, the multiple adjustment logic hardware 80 of the associated instruction access pointers is required. FIG. 7 shows an example RBTIG apparatus of the single adjustment logic hardware 80 of the instruction access pointer with the adjustment logic hardware 90 and 91 of the 'n' number of the micro-operation access pointers.

Each C3 instruction groups at least one or more instruction(s). FIG. 7 illustrates that a single C3 instruction represents multiple non-grouped instructions. The adjustment logic hardware 80 of the instruction access pointer points one of the instructions grouped. A non-grouped instruction can be considered a C3 instruction that groups only one instruction. Each address/flag storage 82 or 83 of the upper-level RBTIG memory 81 contains three key pieces of information—(1) an initial address 86 of the lower-level RBTIG memory 92, (2) a termination flag 84 for ending current C3 instruction execution, and (3) an operational flag 85 for parallel execution of the pointed instruction in the C3 instruction with the instruction located in the next location 82 or 83 of the upper-level RBTIG memory 81. The initial address 86 of the lower-level RBTIG memory 92 indicates the first micro-operation of the current instruction executed in the C3 instruction. The termination flag 84 is used to determine whether or not the current C3 instruction execution is ended by the current instruction. The operational flag 85 indicates that the current instruction is able to concurrently execute with the instruction located in the next location of the upper-level RBTIG memory 81.

Each instruction grouped in a C3 instruction has at least one or more micro-operation(s). FIG. 7 illustrates that a single instruction represents multiple micro-operations. The adjustment logic hardware 90 and 91 of the micro-operation access pointers point to one or multiple micro-operations. Each storage of the lower-level RBTIG memory 92 contains three key pieces of information—(1) a termination flag 95 for ending current micro-operation execution, (2) specific information 96 of the micro-operation for data processing, resource location, and so on, and (3) micro-branch operational flag 97 for directly branching to another micro-operation in the lower-level RBTIG memory 92. The termination flag 95 is used to determine whether or not the current micro-operation execution is ended by the current micro-operation. The pre-decoded information, including control words, is stored as specific information 96 of the micro-operation. If only a non-grouped instruction is decoded, the specific information 96 of the micro-operation is already available in the lower-level RBTIG memory 92 before the adaptive instruction decoder 7-*a* obtains the extracted information of the instruction decoded. The extracted information is either stored to the lower-level RBTIG memory 92 or delivered directly to the back-end processing engines 8 after decoding the instruction. The micro-branch operational flag 97 indicates that the current micro-operation branches to another micro-operation of a branch instruction grouped in the C3 instruction. This allows eliminating a branch instruction during the branch-trimming and grouping procedure shown in FIG. 2.

The hierarchical RBTIG hardware system shown in FIG. 7 has the 'x' arrays of 'y'-bit upper-level RBTIG memory 81 and the 's' arrays of 't'-bit lower-level RBTIG memory 92.

An instruction termination flag bit in a 'y'-bit array must be set, when each C3 instruction completes the entire instructions grouped. The parallel operational flag bit serves to determine concurrent operations by accessing two or more consecutive instructions in the same C3 instruction at the same time. The upper-level RBTIG memory 81 always references this parallel operation bit at the new instruction execution. For instance, two instructions are used for parallel execution of at least two micro-operations at different locations in the lower-level RBTIG memory 92 if the parallel operational flag bit 85 of the current instruction is set. In this case, the instruction access pointer value is adjusted by two. Otherwise, the instruction access pointer value is updated by one for the sequential instruction execution. This hierarchical RBTIG hardware scheme reduces overheads on the upper- and the lower-level RBTIG memory spaces 81 and 92 and the lower-level RBTIG memory 92 address computing time.

The lower-level RBTIG memory 92 format contains two flag bits, one for micro-branch operations and another for terminating micro-operations of current instructions. The micro-branch flag bit 97 initiates a backward micro-branch operation to the first instruction in the C3 instruction by readjusting the instruction access pointer 80 with the initial value temporally stored in the instruction access pointer 75. For the forward micro-branch operation, the micro-branch flag bit 97 performs a branch operation to the last instruction in the C3 instruction by reloading the initial value stored in the instruction access pointer 75 to the instruction access pointer 80. Except for the micro-operation termination flag bit 95 and the micro-branch flag bit 97, the remaining bits in the same array in the lower-level RBTIG memory 92 contain specific information of the micro-operation where necessary control, data, extracted information, and other information and signals are captured. If both the instruction and the micro-operation termination flag bits are set, an RBTIG procedure is complete; otherwise, the instruction access pointer 80 and/or the micro-operation access pointers 90 and 91 are adjusted to execute the next instruction and/or micro-operation of the same instruction.

The adaptive instruction decoder 7-*a* is able to decode both non-grouped and C3 instructions, but handles them differently. The adaptive instruction decoder 7-*a* produces two types of decoding outputs—information extracted from the instructions decoded and control words for the back-end processing engines 8—for the non-grouped instructions. The extracted information is stored in the lower-level RBTIG memory 92 after decoding or delivered to the back-end processing engines 8. The adaptive instruction decoder 7-*a*, however, uses the pre-decoded information 76 for decoding C3 instructions instead of extracting decoding information. The adaptive instruction pre-fetch/fetch units 6-*a* in FIG. 1 fetch the pre-decoded information 76 from the adaptive instruction memory 5-*a* and stores the information to the upper-RBTIG memory 81 and lower-RBTIG memory 92 during the pre-RBTIG operation. In particular, the adaptive instruction decoder 7-*a* initializes the instruction and the micro-operation access pointers with the initial values 75 and loads the start address of the upper-level RBTIG memory 81 for a sequence of the C3 or non-grouped instruction and the initial address of the lower-level RBTIG memory 92 for a sequence of the micro-operations of the C3 or non-grouped instruction pointed by the instruction access pointer 80.

The back-end processing engines 8 execute the non-grouped and C3 instructions by interoperating with the hierarchical RBTIG memory system shown in FIG. 7. The hierarchical RBTIG memory system consists of the upper-level RBTIG memory 81 for ordering the instructions grouped in each C3 instruction (C-1), and the lower-level RBTIG memory 92 for ordering the micro-operations assigned in each instruction grouped in the C3 or non-grouped instruction (C-2). The upper-level RBTIG memory 81 carries the location information of the sequential instructions grouped into a C3 instruction. The lower-level RBTIG memory holds the micro-operation sequences of the non-grouped instructions used in the C3 instruction. In addition, the lower-level RBTIG memory 92 contains pre-decoded information if the C3 instruction is decoded. After the adaptive instruction decoder 7-*a* produces the decoding outputs of a C3 instruction, the one initialized instruction and the 'n' initialized micro-operation access pointers 75 indicate the initial access locations of the upper- and the lower-level RBTIG memories (i.e., 81 and 92) to read the contents. The instruction access pointer value for a C3 instruction is adjusted to access the next location of the upper-level RBTIG memory 81 whenever the last micro-operation of the instruction in the C3 instruction is completed. Similarly, the micro-operation access pointer value for an instruction is adjusted to access the next location of the lower-level RBTIG memory 92 whenever a micro-operation of the instruction is completed.

These hierarchical operations are recursively continued until the completion of a micro-operation sequence for an instruction and an instruction sequence for a C3 instruction are detected. An end to the micro-operation sequence is detected if the micro-operation termination bit 95 of the current micro-operation is set. This triggers instruction access pointer 80 to point the next instruction located 82 or 83 in the upper-level RBTIG memory 81, so that the micro-operations of the next instruction can be read and executed. The instruction termination bit 84 is set when the last micro-operation of the last instruction of the current C3 instruction is complete. This is the ending point of the recursive RBTIG operation.

DETAILED DESCRIPTION OF EXAMPLE EMBODIMENTS

A. Overview

Turning now descriptively to the drawings, in which similar reference characters denote similar elements throughout the several views, the figures illustrate nine blocks of an adaptive microprocessor system including software compilation procedure and microprocessor system hardware in prior arts shown in FIG. 1. The adaptive back-end software compilation procedure is illustrated in FIG. 2. In particular, the branch-trimming and instruction grouping (BTIG) components, and micro-architecture interactive compilations, such as adaptive microware code generation and adaptive configware compilation, and their interoperations are illustrated in FIG. 2. Detailed BTIG operations are shown in FIGS. 3, 4, and 5. The reverse BTIG procedure, operation, and components are illustrated in FIG. 6. Detailed reverse BTIG hardware scheme and operations are shown in FIG. 7.

B. Binary Object Code

Binary object code 1 is application program in binary form. Binary object code 1 is an executable object code consisting of only the instructions defined in the target ISA 4. Binary object code 1 is obtained after target software compilation 2 of the application program. Binary object code 1 is stored into the main instruction memory 5.

C. Target Software Compiler

Target software compiler 2 takes high-level program 3 of application written in high-level programming languages such as C and C++ as an input. Target software compiler 2 is typically developed by referencing the target instruction set architecture (ISA) 4. Target software compiler 2 produces binary object code 1 as an output.

D. High-Level Program

High-level program 3 is an application program written in high-level programming languages such as C, C++, and so on. High-level program 3 is an input of the target software compiler 2.

E. Instruction Set Architecture (ISA)

Instruction set architecture (ISA) 4 contains the executable instructions that are implemented in the target microprocessor. ISA 4 is the part of the microprocessor that is visible to the application programmer or software compiler writer. ISA 4 serves as the boundary between the software and hardware of the target microprocessor. In particular, the instructions defined in an ISA 4 represent the operations bound to hardware of the target microprocessor.

F. Instruction Memory

Instruction memory 5 stores the binary object code 1. Instruction memory 5 generally consists of the slow and large main instruction memory and small and fast cache memories. The cache memories are located between the main instruction memory and the front-end of the microprocessor.

G. Instruction Fetch Unit

Instruction fetch unit 6 typically contains instruction queues, branch prediction logic, and other hardware. Instruction fetch unit 6 fetches the binary object code 1 stored in the instruction memory 5 via the instruction cache. In particular, branch prediction logic in the instruction fetch unit 6 predicts the program execution order that is determined by the branch instruction fetched. A correct branch prediction saves instruction fetching time of next instruction in correct execution order.

H. Instruction Decoder

Instruction decoder 7 decodes the binary object code 1 fetched through the instruction fetch unit 6 and produces control words and extracts information from the binary object code 1 decoded. Instruction decoder 7 passes its outputs to the back-end processing engines 8 for execution of the instruction decoded. In particular, instruction decoder 7 provides designated micro-operations 9 as parts of the instruction decoding results.

I. Back-end Processing Engines

Back-end processing engines 8 execute the function of the instructions decoded. Back-end processing engines 8 typically consist of datapaths, functional units, register files, and other hardware resources.

J. Micro-Operations

Micro-operations 9 are detailed low-level instructions for implementing complex machine instructions. A complex instruction set computer (CISC) instruction is implemented with sequences of micro-operations. However, a simple instruction such as reduced instruction set computer (RISC) instruction can be implemented with a micro-operation depending on the structure of the back-end processing engines 8. Control words produced by the instruction decoder 7 can perform the same or similar operations implemented in micro-operations. Micro-operations 9 are designed while developing the back-end processing engines of the microprocessor.

K. Adaptive Instruction Memory

Adaptive instruction memory 5-*a* may have the same or similar structure and storages as instruction memory 5.

Adaptive instruction memory 5-*a* may have longer latency and simplified cache hierarchy because of grouped instructions, which carry multiple functions of instructions in a condensed form. Adaptive instruction memory 5-*a* contains both of the non-grouped and instantaneously grouped instructions such as branch-trimmed and grouped instructions as object binary code. However, adaptive instruction memory 5-*a* contains additional information in binary form. Adaptive instruction memory 5-*a* also holds an adaptive configware code for decoding the non-grouped and grouped instructions at a different location. Adaptive instruction memory 5-*a* stores adaptive microware code including pre-decoded information, sequences of micro-operations, and/or control words.

L. Adaptive Instruction Pre-fetch/Fetch Units

Adaptive instruction pre-fetch/fetch units 6-*a* encompass instruction pre-fetch and fetch logic, associated storages, simplified branch prediction logic, and other interface logic hardware. Adaptive instruction pre-fetch/fetch units 6-*a* allocate between adaptive instruction memory 5-*a* and adaptive instruction decoder 7-*a*. Adaptive instruction pre-fetch unit 6-*a* is not always necessary. Adaptive instruction pre-fetch/fetch units 6-*a* fetch two different types of instructions—non-grouped and grouped instructions—from the adaptive instruction memory 5-*a* addressed by a program counter, which contains location information of the currently fetched instruction stored in the adaptive instruction memory 5-*a*. In particular, adaptive instruction pre-fetch/fetch units 6-*a* fulfill the pre-reverse branch-trimming and instruction grouping for redirecting instruction flow. Adaptive instruction pre-fetch/fetch units 6-*a* redirect instruction flow by accepting one of the instructions already fetched if the branch target address of the decoded branch instruction is known. Otherwise, the simplified branch prediction logic hardware along with the adaptive instruction pre-fetch/fetch units 6-*a* alternatively provide a branch target address that is collected from the previously taken branch operation of the same instruction decoded. If there is not a branch-taken history, the adaptive instruction pre-fetch/fetch units 6-*a* must wait for the branch target address determined by the adaptive instruction decoder 7-*a*.

M. Adaptive Instruction Decoder

Adaptive instruction decoder 7-*a* is able to decode both non-grouped and C3 instructions, but handles them differently. Adaptive instruction decoder 7-*a* decodes instructions along with adaptive configware code. Adaptive instruction decoder 7-*a* decodes the instruction through the decoding logic hardware configured by the associated adaptive configware code when decoding a non-grouped instruction, which is the same instruction defined in the target ISA. Adaptive instruction decoder 7-*a* accesses the adaptive microware code of the branch target instructions in the instruction cache of the adaptive instruction memory 5-*a* via the adaptive instruction pre-fetch/fetch units 6-*a*. Adaptive instruction decoder 7-*a* produces control words and decoding information as decoding outputs. The control words are signals used for enabling datapaths, functional units, and other hardware components in the back-end processing engines 8. The decoding information extracted from the decoded instruction, which includes addresses of register files, immediate data, and other information necessary for executing the instruction with the control words. On the other hand, the adaptive instruction decoder 7-*a* only identifies C3 instructions and directly obtains the decoding output by accessing the microware codes of the grouped instruction from the adaptive instruction memory 5-*a* via the adaptive instruction pre-fetch/fetch units 6-*a* without performing the decoding operations that are usually performed for decoding the ungrouped instructions. The adaptive micro-operations are continuously accessed until the last instruction in the grouped instruction is completed.

Adaptive instruction decoder 7-*a* also generates and delivers the instruction length of the decoded instruction to the adaptive instruction pre-fetch/fetch units 6-*a*. Adaptive instruction decoder 7-*a* contains the program counter to determine the next instruction location unlike conventional microprocessors. This allows two unique advantages: (1) the branch instructions in the C3 instructions independently operate so that the trimmed branch correctly redirects the micro-operation flows of the instructions grouped without changing the program counter value if the C3 instruction grouped any branch instruction; and (2) the adaptive instruction pre-fetch/fetch units 6-*a* fetch both possible branch target instructions before the back-end processing engines 8 complete all micro-operations of the current C3 instruction. The adaptive instruction decoder 7-*a* decodes a branch instruction while the back-end processing engines 8 execute the previous instruction. Finally, the adaptive instruction decoder 7-*a* decides the branch direction as soon as the branch condition is fixed by completing the previous instruction at the back-end processing engines 8. The adaptive instruction decoder 7-*a* swiftly decodes one of the two fetched instructions as the current instruction, which is pointed at by the program counter in the adaptive instruction decoder 7-*a*. This reduces branch miss prediction penalty with a simplified branch prediction logic hardware in the adaptive instruction pre-fetch/fetch units 6-*a*. In addition, the branch prediction logic hardware may not be necessary if branch instructions carry the branch target addresses.

Adaptive instruction decoder 7-*a* performs the main and post-reverse branch-trimming and instruction grouping (RBTIG) along with three designated memories (e.g., cache memories)—the adaptive configware memory 70, the upper-level 71 and the lower-level reverse branch-trimming and instruction grouping memories 72 in the hierarchical reverse branch-trimming and instruction grouping units. Adaptive instruction decoder 7-*a* determines an instruction flow direction whenever decoding branch-taken instructions, which are not trimmed and grouped either, during the main and post RBTIG operations B-2. Similar to the branch operation at the adaptive instruction decoder 7-*a*, the other operations, which also interrupt sequential instruction flow, need to inform the adaptive instruction decoder 7-*a* the new target address of the instruction flow. For instance, interrupt operations are detected and initiated during the micro-operation executions B-3. In order to perform dedicated interrupt service routines, the program counter in the adaptive instruction decoder 7-*a* must point the start location of the interrupt service routines. Consequently, the new program counter value is updated by the adaptive instruction decoder 7-*a* whenever instruction flow is disrupted.

Adaptive instruction decoder 7-*a* produces two types of decoding outputs—information extracted from the instructions decoded and control words for the back-end processing engines 8—for the non-grouped instructions. The extracted information is stored in the lower-level RBTIG memory 92 after decoding or delivered to the back-end processing engines 8. Adaptive instruction decoder 7-*a*, however, uses the pre-decoded information 76 for decoding C3 instructions instead of extracting decoding information. Adaptive instruction pre-fetch/fetch units 6-*a* in FIG. 1 fetch the pre-decoded information 76 from the adaptive instruction memory 5-*a* and store the information to the upper-RBTIG memory 81 and lower-RBTIG memory 92 during the pre-RBTIG operation. In particular, the adaptive instruction decoder 7-*a* initializes the instruction and the micro-operation access pointers with the initial values 75 and loads the start address of the upper-level RBTIG memory 81 for a sequence of the C3 or non-grouped instruction and the initial address of the lower-level RBTIG memory 92 for a sequence of the micro-operations of the C3 or non-grouped instruction pointed at by the instruction access pointer 80.

Adaptive instruction decoder 7-*a* generates and passes its decoding outputs to the back-end processing engines 8 regardless of whether the instructions are bound before or after fabrication of the microprocessor. The adaptive instruction decoder 7-*a* also sends access information to the upper-level RBTIG unit memory 71, which also has logic hardware for guiding single or multiple micro-operation(s) of the instruction(s). In particular, adaptive instruction decoder 7-*a* obtains the extracted information of the instruction decoded after the specific information 96 of the micro-operation is already available in the lower-level RBTIG memory 92 if only a non-grouped instruction is decoded. Adaptive instruction decoder 7-*a* stores the extracted information to the lower-level RBTIG memory 92 after decoding the instruction or delivers the information to the back-end processing engines 8.

N. Adaptive Back-End Software Compilation

Adaptive back-end software compilation A-2 performs branch-trimming and instruction grouping compilation of the input software (i.e., assembly and/or binary object codes 1). The adaptive back-end software compilation A-2 outputs branch-trimmed and grouped assembly/binary object codes as adaptive binary object code 14 and produces an input for the adaptive microware compilation A-3, which formats new instructions created and used for the adaptive binary object code 14 as well as binds the new instructions, such as branch-trimmed and/or grouped instructions, to the micro-operations 9 and the pre-decoded information.

Adaptive back-end software compilation A-2 is a recursive procedure. A cycle of the adaptive back-end software compilation A-2 carries out the following sub-operations: (1) identification and collection of qualified instruction segments 10 from the software binary object code 1. From all of the branch instructions, the associated branch target instructions are identified and used for qualifying the instruction segments. Any data and resource dependencies and operational and structural constraints are also identified and collected for the same purpose; (2) instructions within a qualified instruction segment, except for the instruction at the beginning location, must not branch to and become branch targets from outside the instruction segment. Once an instruction segment is grouped, the grouped instruction can be an instruction of another instruction segment for further instruction grouping; (3) an adaptive binary object code 14 is generated if any qualified instruction segment is not found; (4) otherwise, the branch-trimming and instruction grouping qualification procedure 11 initiates the next C3 instruction conversion procedure 12 that converts qualified instruction segments to associated C3 instructions. The output of the conversion procedure 12 is passed to the adaptive microware compilation A-3; and (5) an adaptive back-end software transformation procedure 13 replaces the qualified instruction segments with the C3 instructions formatted and bound by the adaptive microware compilation A-3 and reorders the entire instructions with the new addresses calculated.

Adaptive back-end software compilation A-2 repeats all of the compilation procedures including micro-architecture interactive compilation, adaptive microware A-3 and adaptive configware A-4 compilations, to finally produce an adaptive binary object code 14 with generated intermediate outputs including the adaptive ISA 17 from the adaptive configware compilation A-4 and the adaptive microware code from the adaptive microware compilation A-3. This recursive compilation continues until no qualified instruction segment is found. However, this recursive compilation can also be terminated at the end of each adaptive back-end software compilation cycle.

O. Adaptive Microware Compilation

Adaptive microware compilation A-3 is one of the micro-architecture interactive compilations. Adaptive microware compilation A-3 formats and binds the C3 instructions to the micro-operations already implemented in the target back-end processing engines 8. The adaptive microware compilation A-3 generates two types of adaptive microware code outputs—(1) micro-operation sequences and pre-decoded information of the C3 instructions and (2) hierarchical instruction binding information that links the C3 instructions to the micro-operations of the instructions in the grouped instructions—via its mandatory procedure 15. The adaptive microware codes also contain the instruction binding information of the non-grouped instructions. Therefore, the adaptive instruction decoder 7-*a* is able to generate and pass its decoding outputs to the back-end processing engines 8 regardless of whether the instructions are bound before or after fabrication of the microprocessor. In prior arts, instruction binding must be completed before the microprocessor fabrication. As an optional microware compilation procedure 16, the C3 instructions are further processed for improving the adaptive microprocessor performance. For instance, the optional procedure 16 rearranges the execution order of the micro-operations of the C3 instructions for parallel execution at the micro-operation level. The same procedure 16 reorders the micro-operations based on the dataflow of the internal micro-operations of the C3 instructions. This can eliminate unnecessary micro-operations related to temporary data store and load operations. This optional procedure 16 also performs dependency resolution operations at the micro-operation level, which are not possible in the prior arts.

P. Adaptive Configware Compilation

Adaptive configware compilation A-4 is another micro-architecture interactive compilation. Adaptive configware compilation A-4 is for decoding entire non-grouped and grouped instructions by employing the adaptive instruction decoder 7-a. Adaptive configware compilation A-4 uses the original ISA 4 and the adaptive ISA 17 for decoding non-grouped and grouped (e.g., C3) instructions, respectively. Adaptive configware compilation A-4 generates an adaptive configware code that concurrently executes when the adaptive instruction decoder 7-a decodes instructions, especially for identifying the C3 instructions. Composing an adaptive ISA 17 is another major procedure in the adaptive configware compilation A-4. The adaptive ISA consists of non-grouped and grouped instructions used in the adaptive binary object code 14, which is generated by the last procedure of the adaptive back-end software compilation A-2. In particular, the adaptive ISA 17 produces the branch-trimmed and/or grouped instructions as C3 instructions that are completely hidden from the application programmers who generally use only the software compiler. This results in natural software code protection and compression.

Q. Identification and Collection Procedure of Qualified Instruction Segments The identification and collection procedure of qualified instruction segments 10 searches the instruction segments for branch-trimming and instruction grouping (BTIG) from the software binary object code 1. The identification and collection procedure of qualified instruction segments 10 identifies instruction segments beginning from branch instructions and ending with associated branch target instructions or vice versa. The identification and collection procedure of qualified instruction segments 10 collects the condition parameters for the BTIG operations. The identification and collection procedure of qualified instruction segments 10 also collects data and resource dependencies and operational and structural constraints in the identified instruction segments for the BTIG operations.

R. Branch-trimming and Instruction Grouping Qualification Procedure

Branch-trimming and instruction grouping qualification procedure 11 evaluates the identified instruction segments with the condition parameters for the BTIG operations. Branch-trimming and instruction grouping qualification procedure 11 also evaluates the data and resource dependencies and operational and structural constraints collected in the identified instruction segments for the BTIG operations. Branch-trimming and instruction grouping qualification procedure 11 initiates the next C3 instruction conversion procedure 12 that converts qualified instruction segments to associated C3 instructions.

S. Compatible, Compact, Ciphered (C3) Instruction Conversion Procedure

Compatible, compact, ciphered (C3) instruction conversion procedure 12 converts qualified instruction segments to associated compatible, compact, ciphered (C3) instructions. C3 instruction conversion procedure 12 passes the converted C3 instructions to the adaptive microware compilation A-3.

T. Adaptive Back-End Software Transformation Procedure

Adaptive back-end software transformation procedure 13 replaces the qualified instruction segments with the C3 instructions formatted and bound by the adaptive microware compilation A-3. Adaptive back-end software transformation procedure 13 also reorders the entire instructions with the new addresses calculated.

U. Adaptive Binary Object Code Generation Procedure

Adaptive binary object code generation procedure 14 produces the final adaptive binary object code if branch-trimming and instruction grouping qualification procedure cannot find any qualified instruction segments for the BTIG operation. Adaptive binary object code generation procedure 14 refers to the adaptive ISA 17 composed during the adaptive configware compilation A-4.

V. Adaptive Microware Code Generation Procedure

Adaptive microware code generation procedure 15 is a mandatory procedure for generating adaptive microware codes, which include (1) micro-operation sequences and pre-decoded information of the C3 instructions, (2) hierarchical instruction binding information that links the C3 instructions to the micro-operations of the instructions in the grouped instructions, and (3) the instruction binding information of the non-grouped instructions.

W. Microware Optimization Procedure

Microware optimization procedure 16 is an optional procedure for improving the adaptive microprocessor performance. Microware optimization procedure 16 rearranges the execution order of the micro-operations of the C3 instructions for parallel execution at the micro-operation level. Microware optimization procedure 16 reorders the micro-operations based on the dataflow of the internal micro-operations of the C3 instructions. Microware optimization procedure 16 eliminates unnecessary micro-operations related to temporary data store and load operations. Microware optimization procedure 16 also performs dependency resolution operations at the micro-operation level, which is not possible in the prior arts.

X. Adaptive Instruction Set Architecture (ISA) Composition Procedure

Adaptive instruction set architecture (ISA) composition procedure 17 composes a C3 instruction set as a part of the adaptive ISA. Adaptive ISA composition procedure 17 produces the branch-trimmed and/or grouped instructions as C3 instructions that are completely hidden from the application programmers who generally use only the software compiler. This results in natural software code protection and compression. The C3 instruction set describes all of the necessary information, such as C3 instruction format, branch-trimmed and/or grouped instruction sequences, and others, on the C3 instructions generated. Adaptive ISA composition procedure 17 collects non-grouped instructions from the original target ISA and encompasses them to the C3 instruction set composed.

Y. Adaptive Configware Code Generation Procedure

Adaptive configware code generation procedure 18 produces configuration code for the adaptive instruction decoder 7-a.

Z. First Branch-trimming and Instruction Grouping (BTIG) Operation

First branch-trimming and instruction grouping (BTIG) operation D-1 groups at least three different types of instructions and instruction segments in the order as seen in FIG. 3. The first type of instruction 22 must be a branch-target instruction, which is located before its branch instruction in the instruction order. The second type of instruction or instruction segment 23 is a non-branch instruction or instruction segment that does not include any branch or branch-target instruction. However, the second type of instruction or instruction segment 23 must be located after the first type of instruction 22. The third type of instruction 24 is a backward branch instruction that redirects the program order to the second type of instruction 22. The backward branch instruction 24 is trimmed when all of the three types of instructions are grouped to a C3 instruction. The branch-trimmed instruction in the C3 instruction performs a micro-branch to its branch-target instruction 22 during the execution of the C3 instruction. The fourth type of instruction or instruction segment 21 is a non-branch/non-branch-target instruction or instruction segment that does not include any branch or branch-target instructions like the second type of instruction/segment 23. The fourth type of instruction segment 21 can be grouped without any of the other three types of instructions used by the first BTIG operation D-1. First branch-trimming and instruction grouping (BTIG) operation D-1 also groups the three types of instructions and instruction segments 24, 23, and 22 with a forward branch instruction as the third type of the instruction 24 in reverse order. The forward branch instruction located prior to the other first and second types of instructions is trimmed. In this case, the fourth type of instruction or instruction segment 21 can be located before the third type of instruction 24 and/or after the first type of instruction or instruction segment 22.

AA. Second Branch-Trimming and Instruction Grouping (BTIG) Operation

Second branch-trimming and instruction grouping (BTIG) operation D-2 groups two different types of instructions and instruction segments in the order shown in FIG. 3. The first type of instruction or instruction segment 26 that does not include any branch and branch-target instruction can be located before the second branch-target instructions 27. However, the first type of instruction or instruction segment 26 is not always necessary for the second BTIG operation D-2. The second BTIG operation D-2 only groups non-branch instructions instead of trimming a branch instruction. If a branch-target instruction 25 is followed by an instruction segment 26 as seen in FIG. 3, the second BTIG operation D-2 only groups the instruction segment 26 and the second branch-target instructions 27.

AB. Third Branch-Trimming and Instruction Grouping (BTIG) Operation

Third branch-trimming and instruction grouping (BTIG) operation D-3 groups seven different types of instructions and instruction segments in the order illustrated in FIG. 3. A branch-target instruction 30 is only grouped with the following non-branch and non-branch-target instruction segment 31, although the next instruction of the instruction segment 31 is a backward branch instruction 32 that does not jump to the nearest branch-target instruction 30 but goes to another branch-target instruction 28 located before the nearest branch-target instruction 30 from the backward branch instruction 32. If a forward branch instruction 32 jumps to the nearest branch-target instruction 34 and there is no other branch or branch-target instruction between them, the three different types of instructions 32 and 34 and instruction segments 33 are grouped by the third BTIG operation D-3. If the branch instruction 32 jumps to the other instruction or is a backward branch instruction, only the instruction segment 33 and the branch-target instruction 34 are grouped. If the forward branch instruction 32 jumps to the nearest branch-target instruction 34 but the same instruction 32 is a branch-target instruction of another branch instruction, the branch instruction 32 must not be included for the third BTIG operation D-3. For instance, a branch instruction that serves as a branch and a branch-target instruction at the same time must be not grouped with any other instruction.

AC. Fourth Branch-Trimming and Instruction Grouping (BTIG) Operation

Fourth branch-trimming and instruction grouping (BTIG) operation D-4 shows an instruction grouping operation for a subroutine. A subroutine-call instruction 35 jumps to the first instruction in the subroutine 37. If the subroutine does not contain a branch instruction, which jumps out to the subroutine, or a branch-target instruction, which is a destination location for a branch instruction outside the subroutine, then a subroutine can be executed independently after grouping all of the instructions in the subroutine. This single-level subroutine typically consists of non-branch and non-branch-target instructions 37 and 38 and a subroutine return instruction 39, which redirects the program order to the next instruction 36 of the subroutine-call instruction 35. The fourth BTIG operation D-4 not only removes the subroutine-return instruction, which is a branch instruction, but also groups the entire subroutine to a C3 instruction. In addition, the C3 instruction replaces the subroutine-call instruction 35, which calls the grouped subroutine.

AD. Fifth Branch-Trimming and Instruction Grouping (BTIG) Operation

Fifth branch-trimming and instruction grouping (BTIG) operation D-5 is for the multi-loop BTIG operations. As an example of the fifth BTIG operation D-5, a two-level BTIG is shown in FIG. 4. A two-level loop consists of an inner loop and an outer loop. The inner loop consists of a branch-target instruction 43, a non-branch and non-branch-target instruction segment 44, which has no non-branch or non-branch-target instructions, and a branch instruction 45, which jumps back to the branch-target instruction 43. This inner loop is grouped to a C3 instruction at the first iteration of the BTIG operation as shown with dashed lines. Since the C3 instruction grouped at the first iteration can be a non-branch and non-branch-target instruction, the outer loop consists of a branch-target instruction 41, a non-branch and non-branch-target instruction segment 42, the C3 instruction grouped at the previous BTIG operation, another non-branch and non-branch-target instruction segment 46, and a backward branch instruction 47, which jumps to the branch-target instruction 41. Both non-branch and non-branch-target instruction segments 42 and 46 are not necessary for the fifth BTIG operation D-5.

Similar to the other single-loop BTIG operations seen in FIG. 3, a swapped order of a pair of the branch and the associated branch-target instructions is still applicable for the fifth BTIG operations D-5. For instance, the branch-target instruction for an inner loop 43 and the backward branch instruction for the same inner loop 45 is changed to a forward branch instruction 43 and a branch-target instruction of the same inner loop 45, respectively. Fifth BTIG operations D-5 can perform the multi-loop operation and produce a C3 instruction that groups all of the instructions in the multi-loop. The other possible combinations of the multi-loops, which satisfy the BTIG rules shown in FIG. 3, can also be grouped.

Although FIG. 4 illustrates two-level loops, higher level loops can be grouped in a similar manner. Practically, higher levels of loops, such as four-level or higher loops, are rarely found in software. Therefore, the fifth BTIG operation D-5 can only be repeated two or three times. Any non-branch and non-branch-target instruction segments, such as 42, 44, and 46, can be omitted for the fifth BTIG operation D-5.

AE. Sixth Branch-Trimming and Instruction Grouping (BTIG) Operation

Sixth branch-trimming and instruction grouping (BTIG) operation D-6 is for the multi-loop BTIG operations. As an example of the sixth BTIG operation D-6, another two-level loop for the sixth BTIG operation D-6 is shown in FIG. 4. The two-level loop consists of an inner loop and an outer loop. However, both the inner and outer loops share the same branch-target instruction 48. The inner loop consists of the shared branch-target instruction 48, a non-branch and non-branch-target instruction segment 49, and a backward branch instruction 50, which jumps to the branch-target instruction 48. This inner loop is grouped and converted to a C3 instruction. The inner loop BTIG operation is shown with dashed lines. The outer loop consists of the same shared branch-target instruction 48, the C3 instruction grouped in the previous iteration of the BTIG operation, a non-branch and non-branch-target instruction segment 51, and a backward branch instruction 52, which jumps to the branch-target instruction 48.

Unlike the fifth BTIG operation D-5, the sixth BTIG operation D-6 can be performed if the shared branch-target instruction 48 and the backward branch instruction 50 are replaced with a forward branch instruction and another forward branch instruction, respectively. Both of the forward branch instructions jump to the same branch-target instruction located after the later forward branch instruction.

Although FIG. 4 illustrates two-level loops, higher level loops can be grouped in a similar manner. Practically, higher levels of loops, such as four-level or higher loops, are rarely found in software. Therefore, the sixth BTIG operation D-6 can only be repeated two or three times. Any non-branch and non-branch-target instruction segments, such as 49, and 51, can be omitted for the sixth BTIG operation D-6.

AF. Seventh Branch-Trimming and Instruction Grouping (BTIG) Operation

Seventh branch-trimming and instruction grouping (BTIG) operation D-7 is a BTIG operation for the multi-level loops. An example of the seventh branch-trimming and instruction grouping (BTIG) operation D-7 shown in FIG. 5 is a two-level loop consisting of an inner loop and an outer loop. The inner loop consists of a branch-target and branch instruction 60, which jumps forward to the branch-target instruction 62 and serves as a branch-target instruction of another branch instruction 64, a non-branch and non-branch-target instruction segment 61, which does not have any non-branch or non-branch-target instruction, and a branch-target instruction 62. All of the instructions in the inner loop are grouped to a C3 instruction at the first iteration of the BTIG operation as shown with dashed lines. Since the C3 instruction grouped at the first iteration can serve as a non-branch and branch-target instruction, the outer loop consists of a branch-target instruction, which is the C3 instruction grouped at the previous BTIG operation, a non-branch and non-branch-target instruction segment 63, and a backward branch instruction 64, which jumps back to the same C3 instruction serving as the branch-target instruction.

Although the example of the seventh branch-trimming and instruction grouping (BTIG) operation D-7 shown in FIG. 5 is two-level loops, higher level loops can be grouped in a similar manner. Since higher levels of loops, such as four-level or higher loops, are rarely found in software, the recursive BTIG operation can only be repeated two or three times. Any non-branch and non-branch-target instruction segments such as 61 and 63 can be omitted for the same multi-loop BTIG operations.

AG. Eighth Branch-trimming and Instruction Grouping (BTIG) Operation

Eighth branch-trimming and instruction grouping (BTIG) operation D-8 is a BTIG operation for the multi-level loops. An example of the eighth branch-trimming and instruction grouping (BTIG) operation D-8 shown in FIG. 5 is the two-level loops consisting of an inner loop and an outer loop. However, an instruction at 69 operates as a branch-target instruction for an inner loop and as a backward branch instruction for an outer loop. The inner loop consists of a forward branch instruction 67, a non-branch and non-branch-target instruction segment 68, and a dual-operating branch-target and backward branch instruction 69. This inner loop is grouped and converted to a C3 instruction, which serves as a branch instruction, which jumps to the branch-target instruction 65 for the outer loop BTIG operation. The inner loop BTIG operation is shown with dashed lines. The outer loop consists of a branch-target instruction 65, a non-branch and non-branch-target instruction segment 66, and the C3 instruction grouped in the previous iteration of the BTIG operation.

Although the example of the eighth branch-trimming and instruction grouping (BTIG) operation D-8 shown in FIG. 5 is two-level loops, higher level loops can be grouped in a similar manner. Since higher levels of loops, such as four-level or higher loops, are rarely found in software, the recursive BTIG operation can only be repeated two or three times. Any non-branch and non-branch-target instruction segments such as 66 and 68 can be omitted for the same multi-loop BTIG operations.

AH. Branch-Trimming and Instruction Grouping (BTIG) Operation Before Runtime and Pre-Reverse Branch-Trimming and Instruction Grouping (RBTIG) Operation at Runtime Branch-trimming and instruction grouping operation before runtime and pre-reverse branch-trimming and instruction grouping (RBTIG) operation at runtime B-1 is fulfilled at the adaptive instruction pre-fetch/fetch units 6-a. BTIG operation before runtime and pre-RBTIG operation at runtime B-1 allows the adaptive instruction pre-fetch/fetch units 6-a to complete the instruction flow redirection by accepting one of the instructions already fetched, if the branch target address of the decoded branch instruction is known. BTIG operation before runtime and pre-RBTIG operation at runtime B-1 loads pre-decoded information of C3 instructions on the possible instruction flows. If an instruction flow is unknown, the simplified branch prediction logic hardware along with the adaptive instruction pre-fetch/fetch units 6-*a* alternatively provide the possible instruction flow that was collected from the previously taken branch operation of the same instruction. If there is not a branch-taken history, the adaptive instruction pre-fetch/fetch units 6-*a* must wait for the branch target address determined by the adaptive instruction decoder 7-*a*.

AI. Main and Post-Reverse Branch-Trimming and Instruction Grouping (RBTIG) Operation at Runtime Main and post-reverse branch-trimming and instruction grouping (RBTIG) operation at runtime B-2 is fulfilled at the adaptive instruction decoder 7-*a* including three designated memories (e.g., cache memories)—the adaptive configware memory 70, the upper-level 71 and the lower-level reverse branch-trimming and instruction ungrouping memories 72 in the hierarchical reverse branch-trimming and instruction ungrouping units. Main and post-RBTIG operation at runtime B-2 allows the adaptive instruction decoder 7-*a* to determine an instruction flow direction whenever decoding branch-taken instructions, which are not trimmed and grouped either.

A detailed operational procedure of the main and post RBTIG operations B-2 is shown in FIG. 7. After the adaptive instruction decoder 7-*a* decodes an instruction, it is necessary to identify whether the decoded instruction is a C3 instruction or not. This C3 instruction evaluation operation 74 branches two different ways to handle the designated RBTIG operations C-1 and C-2. If the C3 instruction evaluation operation 74 results in the RBTIG operations C-1 and C-2 for C3 instruction, the pre-decoded information loading operation 76 stores the pre-decoded information delivered from the adaptive instruction pre-fetch/fetch units 6-*a* to the upper- and lower-level RBTIG memories 71 and 72. Otherwise, the decoded information from the adaptive instruction decoder 7-*a* is stored to the upper- and lower-level RBTIG memories 71 and 72. Whenever a new instruction is decoded by the adaptive instruction decoder 7-*a*, initialization operations 75 of both instruction and micro-operation access pointers, respectively, are initialized with the starting addresses of the upper- and lower-level RBTIG memories 71 and 72 for the instruction decoded. If a C3 instruction is decoded, the initial addresses of the upper- and lower-level RBTIG memories 71 and 72 are for the addresses of the first instruction grouped in the C3 instruction. For the non-grouped instruction, the initial addresses of the upper- and lower-level RBTIG memories 71 and 72 are for the addresses of the only non-grouped instruction.

AJ. Micro-Operation Execution Operation at Runtime

Micro-operation execution operation at runtime B-3 is initiated when the adaptive instruction decoder 7-*a* passes the decoded information, which is extracted from the instruction decoded, to the back-end processing engines 8. Micro-operation execution operation at runtime B-3 also receives access information to the upper-level RBTIG unit memory 71, which also has logic hardware for guiding single or multiple micro-operation(s) of the instruction(s), from the adaptive instruction decoder 7-*a*. Micro-operation execution operation at runtime B-3 consumes the decoded information and micro-operation sequences of each ungrouped instruction to perform the assigned function of the instruction. Micro-operation execution operation at runtime B-3 directly accesses both the pre-decoded information and micro-operation sequences of the instruction from the lower-level RBTIG unit memory 72 if the instruction is a part of the C3 instruction. Otherwise, micro-operation execution operation at runtime B-3 only accesses the micro-operation sequences of the instruction from the RBTIG unit memory 72.

AK. C3 Instruction Evaluation Operation

C3 instruction evaluation operation 74 identifies whether or not a C3 instruction is decoded whenever the adaptive instruction decoder 7-*a* decodes an instruction. C3 instruction evaluation operation 74 branches two different ways to handle the designated RBTIG operations C-1 and C-2. If the C3 instruction evaluation operation 74 results in the RBTIG operations C-1 and C-2 for C3 instruction, the pre-decoded information loading operation 76 stores the pre-decoded information delivered from the adaptive instruction pre-fetch/fetch units 6-*a* to the upper- and lower-level RBTIG memories 71 and 72. Otherwise, the decoded information from the adaptive instruction decoder 7-*a* is stored to the upper- and lower-level RBTIG memories 71 and 72.

AL. Initialization Operations of Instruction and Micro-Operation Access Pointers Initialization operations of instruction and micro-operation access pointers 75, respectively, initialize the instruction and micro-operation access pointers with the starting addresses of the upper- and lower-level RBTIG memories 71 and 72 for the decoded instruction whenever a new instruction is decoded by the adaptive instruction decoder 7-*a*. Initialization operations of instruction and micro-operation access pointers 75 compute the starting addresses of the upper- and lower-level RBTIG memories 71 and 72 from the addresses of the first instruction grouped in the C3 instruction if a C3 instruction is decoded. Otherwise, the initialization operations of instruction and micro-operation access pointers 75 obtain the initial addresses of the upper- and lower-level RBTIG memories 71 and 72 from the addresses of the only non-grouped instruction.

AM. Pre-Decoded Information Loading Operation

Pre-decoded information loading operation 76 selects one of the two instructions in the different possible instruction flows predicted by the branch prediction logic hardware in the adaptive instruction pre-fetch/fetch units 6-*a*. Pre-decoded information loading operation 76 stores the pre-decoded information of the selected instruction delivered from the adaptive instruction pre-fetch/fetch units 6-*a* to the upper- and lower-level RBTIG memories 71 and 72 when the C3 instruction is decoded.

AN. Upper-Level Reverse Branch-Trimming and Instruction Grouping (RBTIG) Memory Unit Upper-level reverse branch-trimming and instruction grouping (RBTIG) memory unit 71 includes adjustment logic hardware 80 of an instruction access pointer and the upper-level RBTIG memory 81. The upper-level RBTIG memory 81 holds sequences of at least one C3 instruction to multiple C3 instructions. If multiple C3 instructions need to be executed concurrently, the multiple adjustment logic hardware 80 of the associated instruction access pointers is required. FIG. 7 shows an example RBTIG apparatus of the single adjustment logic hardware 80 of the instruction access pointer with the adjustment logic hardware 90 and 91 of the 'n' number of the micro-operation access pointers.

AO. Lower-Level Reverse Branch-Trimming and Instruction Grouping (RBTIG) Memory Unit Lower-level reverse branch-trimming and instruction grouping (RBTIG) memory unit 72 includes adjustment logic hardware 90 and 91 of the micro-operation access pointers and the lower-level RBTIG memory 92. The lower-level RBTIG memory 92 holds sequences of at least one micro-operation to multiple micro-operations. If multiple C3 instructions and multiple micro-operations need to be executed concurrently, the multiple adjustment logic hardware 80 of the associated instruction access pointers is required. FIG. 7 shows an example RBTIG apparatus of the single adjustment logic hardware 80 of the instruction access pointer with the adjustment logic hardware 90 and 91 of the 'n' number of the micro-operation access pointers.

AP. Adjustment Logic Hardware of Instruction Access Pointer

Adjustment logic hardware 80 of the instruction access pointer points one of the instructions grouped. Multiple adjustment logic hardware 80 of the associated instruction access pointers is required if multiple C3 instructions need to be executed concurrently. A single adjustment logic hardware 80 of the instruction access pointer with the adjustment logic hardware 90 and 91 of the 'n' number of the micro-operation access pointers are shown in FIG. 7. Adjustment logic hardware 80 of the instruction access pointer readjusts the instruction access pointer with the initial value temporarily stored in the instruction access pointer 75 when the micro-branch flag bit 97 initiates a backward micro-branch operation to the first instruction in the C3 instruction. Adjustment logic hardware 80 of the instruction access pointer reloads the initial value stored in the instruction access pointer 75 for the forward micro-branch operation executed by the micro-branch flag bit 97, which performs a branch operation to the last instruction in the C3 instruction. Adjustment logic hardware 80 of the instruction access pointer adjusts the instruction access pointer to execute the next instruction.

AQ. Upper-Level Reverse Branch-Trimming and Instruction Grouping (RBTIG) Memory Upper-level reverse branch-trimming and instruction grouping (RBTIG) memory 81 holds sequences of at least one C3 instruction to multiple C3 instructions. Upper-level RBTIG memory 81 is 'x' entries of 'y'-bit arrays where 'x' and 'y' are positive integer numbers. Each address/flag storage 82 or 83 of the upper-level RBTIG memory 81 contains three key pieces of information—(1) an initial address 86 of the lower-level RBTIG memory 92, (2) a termination flag 84 for ending current C3 instruction execution, and (3) an operational flag 85 for parallel execution of the pointed instruction in the C3 instruction with the instruction located in the next location of the upper-level RBTIG memory 81. An instruction termination flag bit in a 'y'-bit array must be set, when each C3 instruction completes the entire instructions grouped. The initial address 86 of the lower-level RBTIG memory 92 indicates the first micro-operation of the current instruction executed in the C3 instruction. The termination flag 84 is used to determine whether or not the current C3 instruction execution is ended by the current instruction. The operational flag 85 indicates that the current instruction is able to execute concurrently with the instruction located in the next location of the upper-level RBTIG memory 81. The parallel operational flag bit serves to determine concurrent operations by accessing two or more consecutive instructions in the same C3 instruction at the same time. Upper-level RBTIG memory 81 always references this parallel operation bit at the new instruction execution. For instance, two instructions are used for parallel execution of at least two micro-operations at different locations in the lower-level RBTIG memory 92 if the parallel operational flag bit 85 of the current instruction is set.

AR. Adjustment Logic Hardware of Micro-operation Access Pointer

Adjustment logic hardware 90 and 91 of the micro-operation access pointers shown in FIG. 7 accesses up to the 'n' number of micro-operations. Adjustment logic hardware 90 and 91 of the micro-operation access pointers point one or multiple micro-operations. Adjustment logic hardware 90 and 91 of the micro-operation access pointers adjust to execute micro-operation of the next instruction. The adaptive instruction decoder 7-a initializes the micro-operation access pointers with the initial values 75.

AS. Lower-Level Reverse Branch-Trimming and Instruction Grouping (RBTIG) Memory Lower-level reverse branch-trimming and instruction grouping (RBTIG) memory 92 holds 's' entries of 't'-bit arrays where 's' and 't' are positive integer numbers. Lower-level RBTIG memory 92 holds sequences of at least one micro-operation to multiple micro-operations. If multiple C3 instructions need to be executed concurrently, the multiple adjustment logic hardware 80 of the associated instruction access pointers is required. FIG. 7 shows an example RBTIG apparatus of the single adjustment logic hardware 80 of the instruction access pointer with the adjustment logic hardware 90 and 91 of the 'n' number of the micro-operation access pointers.

Each instruction grouped in a C3 instruction has at least one or more micro-operation(s). FIG. 7 illustrates that a single instruction represents multiple micro-operations. The adjustment logic hardware 90 and 91 of the micro-operation access pointers point one or multiple micro-operations. Each storage of the lower-level RBTIG memory 92 contains three key pieces of information—(1) a termination flag 95 for ending current micro-operation execution, (2) specific information 96 of the micro-operation for data processing, resource location, and so on, and (3) a micro-branch operational flag 97 for directly branching to another micro-operation in the lower-level RBTIG memory 92. The termination flag 95 is used to find whether or not the current micro-operation execution is ended by the current micro-operation. All of the pre-decoded information, including control words and extracted information, is stored as specific information 96 of the micro-operation. If only a non-grouped instruction is decoded, the specific information 96 of the micro-operation is already available in the lower-level RBTIG memory 92 before the adaptive instruction decoder 7-a obtains the extracted information of the instruction decoded. The extracted information is stored to the lower-level RBTIG memory 92 after the instruction is decoded. The micro-branch operational flag 97 indicates that the current micro-operation branches to another micro-operation of a branch instruction grouped in the C3 instruction. This allows for eliminating a branch instruction during the branch-trimming and grouping procedure shown in FIG. 2.

AT. Address/Flag Storage of Next Instruction

Address/Flag storage of the next instruction 82 or 83 consists of three elements—(1) instruction termination flag 84, (2) sequential or parallel operation flag 85, and (3) address of the lower-level RBTIG memory 86.

AU. Instruction Termination Flag

Instruction termination flag 84 is a part of the address/flag storage of the next instruction 82 or 83. Instruction termination flag 84 indicates ending the current C3 instruction execution. Instruction termination flag 84 is used to determine whether or not the current C3 instruction execution is ended by the current instruction. Instruction termination flag 84 is set when the last micro-operation of the last instruction of the current C3 instruction is completed. This is the ending point of the recursive RBTIG operation.

AV. Sequential or Parallel Operation Flag

Sequential or parallel operation flag 85 is a part of the address/flag storage of the next instruction 82 or 83. Sequential or parallel operation flag 85 indicates parallel execution of the pointed instruction in the C3 instruction with the instruction located in the next location 82 or 83 of the upper-level RBTIG memory 81.

AW. Address of Lower-Level Reverse Branch-Trimming and Instruction Grouping (RBTIG) Memory Address of the lower-level reverse branch-trimming and instruction grouping (RBTIG) memory 86 is a part of the address/flag storage of the next instruction 82 or 83. Address of RBTIG memory 86 indicates the first micro-operation of the current instruction executed in the C3 instruction.

AX. Address/Flag Storage of Next Micro-Operation

Address/Flag storage of the next micro-operation 93 or consists of three elements—(1) micro-operation termination flag 95, (2) specific information 96 of the micro-operation for data processing, resource location, and so on, and (3) micro-branch operational flag 97 for directly branching to another micro-operation in the lower-level RBTIG memory 92.

AY. Micro-Operation Termination Flag

Micro-operation termination flag 95 is a part of the address/flag storage of the next micro-operation 93 or 94. Micro-operation termination flag 95 is used to determine whether or not the current micro-operation execution is ended by the current micro-operation. Micro-operation termination flag 95 is set when the last micro-operation of the current instruction is accessed. This triggers instruction access pointer 80 to point to the next instruction located 82 or 83 in the upper-level RBTIG memory 81 so that the micro-operations of the next instruction can be read and executed.

AZ. Specific Information of Micro-Operation

Specific information 96 of the micro-operation is a part of the address/flag storage of the next micro-operation 93 or 94. Specific information 96 of the micro-operation stores all of the pre-decoded information, including control words and extracted information. Specific information 96 of the micro-operation also holds decoding information for non-grouped instructions before the adaptive instruction decoder 7-a obtains the extracted information of the instruction decoded.

BA. Micro-Branch Operational Flag

Micro-branch operational flag 97 is a part of the address/flag storage of the next micro-operation 93 or 94. Micro-branch operational flag 97 indicates that the current micro-operation branches to another micro-operation of a branch instruction grouped in the C3 instruction. This allows for eliminating a branch instruction during the branch-trimming and grouping procedure shown in FIG. 2.

What is claimed is:

1. An apparatus for producing a branch-trimming and instruction grouping and ungrouping comprising:
   an adaptive microprocessor as an adaptive hardware component; and
   convert a microprocessor to an adaptive microprocessor by integrating adaptive hardware components including adaptive instruction memory, adaptive pre-fetch/fetch units, and adaptive instruction decoder;
   pre-fetch/fetch grouped and ungrouped instructions from the adaptive instruction memory to the adaptive pre-fetch/fetch units;
   load adaptive microware code from the adaptive instruction memory to the adaptive instruction decoder via the adaptive pre-fetch/fetch units;
   load adaptive configware code from the adaptive instruction memory to the adaptive instruction decoder;
   identify and decode both of the non-grouped and grouped instructions differently in the adaptive instruction decoder;
   fetch and use pre-decoded sequences of control words and decoding information of the grouped instructions from the instruction memory via the adaptive pre-fetch/fetch units, instead of decoding the non-grouped instructions;
   generate sequences of control words and extract decoding information of the non-grouped instructions through the decoding hardware in the adaptive instruction decoder;
   execute the operations of the non-grouped and the grouped instructions including the branch-trimmed instructions from the software program at the same back-end processing engines of the microprocessor;
   continue to use different instruction sets including grouped instructions after fabrication of the adaptive microprocessors;
   be implemented by using reconfigurable devices, such as field-programmable gate array (FPGA) and/or be fabricated in the form of application-specific integrated circuit (ASIC); and
   adaptive compilers as adaptive software components.

2. The apparatus of claim 1 the branch-trimming and instruction grouping and ungrouping to:
   resolve or lighten the cost of branch penalty;
   save capacity, simplify organization, and operating energy of cache memory;
   tolerate instruction memory latency by dropping the number of instructions fetched from the memory to microprocessor via a bus in the same unit time;
   improve the performance of the adaptive microprocessor system;
   identify the qualified instruction segments for grouping in software before runtime or at adaptive compilation time;

eliminate the number of branch instruction appearances in software before runtime or at adaptive compilation time;
group the branch instructions with non-branch instructions in software before runtime or at adaptive compilation time;
combine non-branch consecutive instructions in software before runtime or at adaptive compilation time;
convert the qualified instruction segments to user-defined compact formats of instructions before runtime or at adaptive compilation time;
execute both the non-grouped and the grouped instructions to achieve functional compatibility and performance enhancements by adaptively ungrouping and executing the non-grouped and the grouped instructions at runtime; and
reduce and cipher software code while maintaining the compatibility of the software code.

3. The apparatus of claim 1 the adaptive compilers to:
convert the software program to the branch-trimmed, shortened and compatible program that allows the adaptive microprocessor to keep executing the operations of the non-grouped and the grouped instructions including the branch-trimmed instructions from the software program;
remove branch instructions from the software program by grouping branch instructions with other single and/or multiple instructions into a compact and ciphered instruction as a branch-trimmed and grouped instruction before runtime or at adaptive compilation time;
group consecutive non-branch instructions into a similar compact and ciphered instruction as a grouped instruction during the adaptive compilation time;
deliver equal and/or improved throughputs of the software rewritten with the branch-trimmed and/or grouped instructions that provide equivalent or improved sequences of internal micro-operations of the instructions;
provide the compatibility of the software, the reduction of the instruction memory including cache memory, and the saving of the operational energy consumption;
provide the software security for preventing malicious and illegal copying of software programs; and
generate sequences of control words and extract decoding information of the non-grouped and grouped instructions.

4. An adaptive microprocessor comprising:
adaptive instruction memory;
adaptive instruction pre-fetch/fetch units;
adaptive instruction decoder; and
back-end processing engines.

5. The apparatus of claim 4 the adaptive instruction memory to:
store adaptive binary object code generated by the adaptive back-end software compilation;
store adaptive microware code including pre-decoded information, sequences of micro-operations, and/or control words generated by the adaptive microware compilation;
store adaptive configware code generated by the adaptive configware compilation;
store micro-operations of the instructions implemented in the back-end processing engines; and
permit longer latency and simplified cache hierarchy.

6. The apparatus of claim 5 the upper-level reverse branch-trimming and instruction grouping (RBTIG) memory unit to include adjustment logic hardware of an instruction access pointer and the upper-level RBTIG memory, which holds sequences of at least one compatible, compact and ciphered (C3) instruction to multiple C3 instructions.

7. The apparatus of claim 6 the adjustment logic hardware of an instruction access pointer to:
concurrently execute multiple C3 instructions with the multiple adjustment logic hardware of the associated instruction access pointers;
readjust the instruction access pointer with the initial value temporarily stored in the instruction access pointer when the micro-branch flag bit initiates a backward micro-branch operation to the first instruction in the C3 instruction;
reload the initial value stored in the instruction access pointer for the forward micro-branch operation executed by the micro-branch flag bit, which performs a branch operation to the last instruction in the C3 instruction; and
adjust the instruction access pointer to execute the next instruction.

8. The apparatus of claim 6 the upper-level reverse branch-trimming and instruction grouping (RBTIG) memory to:
hold sequences of at least one C3 instruction to multiple C3 instructions in the 'x' entries of 'y'-bit arrays where 'x' and 'y' are positive integer numbers; and
contain three key pieces of information—(1) an initial address of the lower-level RBTIG memory to indicate the first micro-operation of the current instruction executed in the C3 instruction, (2) an instruction termination flag for ending current C3 instruction execution by determining whether or not the current C3 instruction execution is ended by the current instruction; setting when each C3 instruction completes the entire instructions grouped; and resetting while a C3 instruction is not completed, and (3) an operational flag for parallel execution of the pointed instruction in the C3 instruction with the instruction located in the next location of the upper-level RBTIG memory by indicating that the current instruction is able to execute concurrently with the instruction located in the next location of the upper-level RBTIG memory and by serving to determine concurrent operations by accessing two or more consecutive instructions in the same C3 instruction at the same time.

9. The apparatus of claim 5 the lower-level reverse branch-trimming and instruction grouping (RBTIG) memory unit to include adjustment logic hardware of the micro-operation access pointers and the lower-level RBTIG memory, which holds sequences of at least one micro-operation to multiple micro-operations.

10. The apparatus of claim 9 the adjustment logic hardware of the micro-operation access pointers to concurrently execute multiple micro-operations of a single or multiple C3 instructions with the multiple adjustment logic hardware of the associated micro-operation access pointers.

11. The apparatus of claim 10 the lower-level reverse branch-trimming and instruction grouping (RBTIG) memory to:
hold sequences of at least one micro-operation to multiple micro-operations in the 's' entries of 't'-bit arrays where 's' and 't' are positive integer numbers; and
contain three key pieces of information—(1) a micro-operation termination flag for ending current micro-operation execution by finding whether or not the current micro-operation execution is ended by the current micro-operation, (2) specific information of the micro-operation for data processing, resource location, and other related operations by providing all of the pre-decoded information, including control words and extracted information and indicating that the current micro-operation branches to another micro-operation of a branch instruction grouped in the C3 instruction for eliminating a branch instruction during the branch-trimming and grouping procedure, and (3) a micro-branch operational flag for directly branching to another micro-operation in the lower-level RBTIG memory by indicating that the current micro-operation branches to another micro-operation of a branch instruction grouped in the C3 instruction to eliminate a branch instruction during the branch-trimming and grouping procedure.

12. The apparatus of claim 4 the adaptive instruction pre-fetch/fetch units to:
   encompass instruction pre-fetch and fetch logic, associated storages, simplified branch prediction logic, and other interface logic hardware;
   allocate between adaptive instruction memory and adaptive instruction decoder;
   fetch two different types of instructions—non-grouped and grouped instructions—from the adaptive instruction memory addressed by a program counter, which contains location information of the currently fetched instruction stored in the adaptive instruction memory;
   fulfill the pre-reverse branch-trimming and instruction grouping for redirecting instruction flow by loading pre-decoded information of C3 instructions from the adaptive instruction memory;
   redirect instruction flow by accepting one of the instructions already fetched if the branch target address of the decoded branch instruction is known;
   provide a branch target address that is collected from the previously taken branch operation of the same instruction decoded if the branch target address of the decoded branch instruction is unknown; and
   wait for the branch target address determined by the adaptive instruction decoder if there is not a branch-taken history.

13. The apparatus of claim 4 the adaptive instruction decoder to:
   decode both non-grouped and grouped or C3 instructions, but handle them differently;
   decode the instruction through the decoding logic hardware configured by the associated adaptive configware code when decoding a non-grouped instruction, which is the same instruction defined in the target ISA;
   access the adaptive microware code of the branch target instructions in the instruction cache of the adaptive instruction memory via the adaptive instruction pre-fetch/fetch units, where the microware code is stored in the upper- and lower-level reverse branch-trimming and instruction grouping (RBTIG) memories;
   produce control words and decoding information as decoding outputs for enabling datapaths, functional units, and other hardware components in the back-end processing engines;
   extract decoding information from the decoded instruction, which includes addresses of register files, immediate data, and other information necessary for executing the instruction with the control words;
   identify C3 instructions and directly obtain the decoding output by accessing the microware codes of the grouped instruction from the adaptive instruction memory via the adaptive instruction pre-fetch/fetch units during the pre-RBTIG operation without performing the decoding operations that are usually performed for decoding the ungrouped instructions, in which the microware code is stored in the RBTIG memories;
   initialize the instruction and the micro-operation access pointers with the initial values, which are the starting addresses of the upper- and lower-level RBTIG memories for the decoded instruction whenever a new instruction is decoded by the adaptive instruction decoder;
   compute the starting addresses of the upper- and lower-level RBTIG memories from the addresses of the first instruction grouped in the C3 instruction if a C3 instruction is decoded;
   obtain the initial addresses of the upper- and lower-level RBTIG memories from the addresses of the only non-grouped instruction if a C3 instruction is not decoded;
   load the start address of the upper-level RBTIG memory for a sequence of the C3 or non-grouped instruction and the initial address of the lower-level RBTIG memory for a sequence of the micro-operations of the C3 or non-grouped instruction pointed at by the instruction access pointer;
   send access information to the upper-level RBTIG unit memory, which also has logic hardware for guiding single or multiple micro-operation(s) of the instruction(s);
   obtain the extracted information of the instruction decoded after the specific information of the micro-operation is already available in the lower-level RBTIG memory if only a non-grouped instruction is decoded;
   generate and deliver the instruction length of the decoded instruction to the adaptive instruction pre-fetch/fetch units;
   contain the program counter to determine the next instruction location for independently operating the branch instructions in the C3 instructions and for permitting the adaptive instruction pre-fetch/fetch units to fetch both possible branch target instructions before the back-end processing engines complete all micro-operations of the current C3 instruction;
   decide the branch direction as soon as the branch condition is fixed by completing the previous instruction at the back-end processing engines;
   decode one of the two fetched instructions as the current instruction, which is pointed at by the program counter in the adaptive instruction decoder, for reducing branch miss prediction penalty with a simplified branch prediction logic hardware;
   perform the main and post-reverse branch-trimming and instruction grouping (RBTIG) along with three designated memories (e.g., cache memories)—the adaptive configware memory, the upper-level and the lower-level reverse branch trimming and instruction grouping memories in the hierarchical reverse branch-trimming and instruction grouping units;
   determine an instruction flow direction whenever decoding branch-taken instructions, which are not trimmed and grouped either, during the main and post RBTIG operations; and
   process other disrupted instruction flows including interrupts by updating the program counter, which points the start location of software program (i.e., interrupt service routine).

14. The apparatus of claim 4 the back-end processing engines to:
   execute the function of the instructions decoded;
   consist typically of datapaths, functional units, register files, and other hardware resources;
   initiate the micro-operation execution operation when the adaptive instruction decoder passes the decoded information, which is extracted from the instruction decoded, to the back-end processing engines;

receive access information to the upper-level RBTIG unit memory, which also has logic hardware for guiding single or multiple micro-operation(s) of the instruction(s), from the adaptive instruction decoder;

consume the decoded information and micro-operation sequences of each ungrouped instructions to perform the assigned function of the instruction;

directly access both the pre-decoded information and micro-operation sequences of the instruction from the lower-level RBTIG unit memory if the instruction is a part of the C3 instruction; and access only the micro-operation sequences of the instruction from the RBTIG unit memory if the instruction is not a part of the C3 instruction.

15. The apparatus of the adaptive compilers comprising:
adaptive back-end software compilation;
adaptive microware compilation;
adaptive configware compilation; and
micro-operations.

16. The apparatus of claim 15 the adaptive back-end software compilation to: perform branch-trimming and instruction grouping (BTIG) compilation of the input software (i.e., assembly and/or binary object codes); the eight BTIG operations are invented; the first BTIG operation is to: group at least three different types of instructions and instruction segments: (a-1) the first type of instruction must be a branch-target instruction, which is located before its branch instruction in the instruction order; (a-2) the second type of instruction or instruction segment is a non-branch instruction or instruction segment that does not include any branch or branch-target instruction, however, the second type of instruction or instruction segment must be located after the first type of instruction; (a-3) the third type of instruction is a backward branch instruction that redirects the program order to the second type of instruction;

the backward branch instruction is trimmed when all of the three types of instructions are grouped to a compatible, compact and ciphered (C3) instruction, the branch-trimmed instruction in the C3 instruction performs a micro-branch to its branch-target instruction during the execution of the C3 instruction; (a-4) the fourth type of instruction or instruction segment is a non-branch/non-branch-target instruction or instruction segment that does not include any branch or branch-target instructions like the second type of instruction/instruction segment, the fourth type of instruction/instruction segment can be grouped without any of the other three types of instructions used by the first BTIG operation; and group the three types of instructions and instruction segments with a forward branch instruction as the third type of the instruction in reverse order, the forward branch instruction located prior to the other first and second types of instructions is trimmed; in this case, the fourth type of instruction or instruction segment can be located before the third type of instruction and/or after the first type of instruction or instruction segment; the second BTIG operation is to group two different types of instructions and instruction segments, the first type of instruction or instruction segment that does not include any branch and branch-target instruction can be located before the second branch-target instructions, however, the first type of instruction or instruction segment is not always necessary for the second BTIG operation; the second BTIG operation only groups non-branch instructions instead of trimming a branch instruction, if a branch-target instruction is followed by an instruction segment, the second BTIG operation only groups the instruction segment and the second branch-target instructions; the third BTIG operation is to group seven different types of instructions and instruction segments;

a branch-target instruction is only grouped with the following non-branch and non-branch-target instruction segment, although the next instruction of the instruction segment is a backward branch instruction that does not jump to the nearest branch-target instruction but goes to another branch-target instruction located before the nearest branch-target instruction from the backward branch instruction, if a forward branch instruction jumps to the nearest branch-target instruction and there is no other branch or branch-target instruction between them, the three different types of instructions and instruction segments are grouped by the third BTIG operation, if the branch instruction jumps to the other instruction or is a backward branch instruction, only the instruction segment and the branch-target instruction are grouped, if the forward branch instruction jumps to the nearest branch-target instruction but the same instruction is a branch-target instruction of another branch instruction, the branch instruction must not be included for the third BTIG operation, for instance, a branch instruction that serves as a branch and a branch-target instruction at the same time must be not grouped with any other instruction; the fourth BTIG operation is to:

group instructions in a subroutine and remove the associated subroutine call and return instructions as branch instructions in software program; group a subroutine that can be executed independently after grouping all of the instructions in the subroutine if the subroutine does not contain a branch instruction, which jumps out to the subroutine, or a branch-target instruction, which is a destination location for a branch instruction outside the subroutine; and replace the subroutine-call instruction, which calls the grouped subroutine that is a C3 instruction; the fifth BTIG operation is to: group instructions in multi-loops recursively;

group a two-level loop consisting of an inner loop and an outer loop; the inner loop consists of a branch-target instruction, a non-branch and non-branch-target instruction segment, which has no non-branch or non-branch-target instructions, and a branch instruction, which jumps back to the branch-target instruction; this inner loop is grouped to a C3 instruction at the first iteration of the BTIG operation, if the C3 instruction grouped at the first iteration can be a non-branch and non-branch-target instruction, the outer loop consists of a branch-target instruction, a non-branch and non-branch-target instruction segment, the C3 instruction grouped at the previous BTIG operation, another non-branch and non-branch-target instruction segment, and a backward branch instruction, which jumps to the branch-target instruction; both non-branch and non-branch-target instruction segments are not necessary for the fifth BTIG operation; group a swapped order of a pair of the branch and the associated branch-target instructions; the branch-target instruction for an inner loop and the backward branch instruction for the same inner loop is changed to a forward branch instruction and a branch-target instruction of the same inner loop, respectively; and perform the multi-loop operation and produce a C3 instruction that groups all of the instructions in the other possible combinations of the multi-loops including higher level loops (i.e., three- or four-level loops), which satisfy the fifth BTIG rules; the sixth BTIG operation is to: group instructions in multi-loops recursively; group a two-level loop consisting of an inner loop and an outer loop;

both the inner and outer loops share the same branch-target instruction, the inner loop consists of the shared branch-target instruction, a non-branch and non-branch-target instruction segment, and a backward branch instruction, which jumps to the branch-target instruction; this inner loop is grouped and converted to a C3 instruction, the outer loop consists of the same shared branch-target instruction, the C3 instruction grouped in the previous iteration of the BTIG operation, a non-branch and non-branch-target instruction segment, and a backward branch instruction, which jumps to the branch-target instruction; perform the BTIG operation if the shared branch-target instruction and the backward branch instruction are replaced with a forward branch instruction and another forward branch instruction, respectively; both of the forward branch instructions jump to the same branch-target instruction located after the later forward branch instruction; and perform the multi-loop operation and produce a C3 instruction that groups all of the instructions in the other possible combinations of the multi-loops including higher level loops (i.e., three- or four-level loops), which satisfy the sixth BTIG rules; the seventh BTIG operation is to: group instructions in multi-loops recursively; group a two-level loop consisting of an inner loop and an outer loop; the inner loop consists of a branch-target and branch instruction, which jumps forward to the branch-target instruction and serves as a branch-target instruction of another branch instruction, a non-branch and non-branch-target instruction segment, which does not have any non-branch or non-branch-target instruction, and a branch-target instruction, all of the instructions in the inner loop are grouped to a C3 instruction at the first iteration of the BTIG operation, since the C3 instruction grouped at the first iteration can serve as a non-branch and branch-target instruction, the outer loop consists of a branch-target instruction, which is the C3 instruction grouped at the previous BTIG operation, a non-branch and non-branch-target instruction segment, and a backward branch instruction, which jumps back to the same C3 instruction serving as the branch-target instruction; and perform the multi-loop operation and produce a C3 instruction that groups all of the instructions in the other possible combinations of the multi-loops including higher level loops (i.e., three- or four-level loops), which satisfy the seventh BTIG rules; the eighth BTIG operation is to: group instructions in multi-loops recursively; group a two-level loop consisting of an inner loop and an outer loop; the inner loop consists of a forward branch instruction, a non-branch and non-branch-target instruction segment, and a dual-operating-branch-target and backward branch instruction, which operates as a branch-target instruction for an inner loop and as a backward branch instruction for an outer loop, this inner loop is grouped and converted to a C3 instruction, which serves as a branch instruction, which jumps to the branch-target instruction for the outer loop BTIG operation, the outer loop consists of a branch-target instruction, a non-branch and non-branch-target instruction segment, and the C3 instruction grouped in the previous iteration of the BTIG operation; and perform the multi-loop operation and produce a C3 instruction that groups all of the instructions in the other possible combinations of the multi-loops including higher level loops (i.e., three- or four-level loops), which satisfy the eighth BTIG rules; output branch-trimmed and grouped assembly/binary object codes as adaptive binary object code; produce an input for the adaptive microware compilation, which formats new instructions created and used for the adaptive binary object code as well as binds the new instructions, such as branch-trimmed and/or grouped instructions, to the micro-operations and the pre-decoded information; recursively carry out the following sub-operations: identification and collection of qualified instruction segments from the software binary object code, from all of the branch instructions, the associated branch target instructions are identified and used for qualifying the instruction segments; any data and resource dependencies and operational and structural constraints are also identified and collected for the same purpose, these identification and collection procedure of qualified instruction segments to:

search the instruction segments for branch-trimming and instruction grouping (BTIG) from the software binary object code; identify instruction segments beginning from branch instructions and ending with associated branch target instructions or vice versa; collect the condition parameters for the BTIG operations; and collect data and resource dependencies and operational and structural constraints in the identified instruction segments for the BTIG operations;

instructions within a qualified instruction segment, except for the instruction at the beginning location, must not branch to and become branch targets from outside the instruction segment; once an instruction segment is grouped, the grouped instruction can be an instruction of another instruction segment for further instruction grouping; this branch-trimming and instruction grouping qualification procedure to:

evaluate the identified instruction segments with the condition parameters for the BTIG operations; evaluate the data and resource dependencies and operational and structural constraints collected in the identified instruction segments for the BTIG operations; and initiate the next C3 instruction conversion procedure that converts qualified instruction segments to associated C3 instructions, this C3 instruction conversion procedure to convert qualified instruction segments to associated C3 instructions and to pass the converted C3 instructions to the adaptive microware compilation; an adaptive binary object code is generated if any qualified instruction segment is not found; otherwise, the branch-trimming and instruction grouping qualification procedure initiates the next C3 instruction conversion procedure that converts qualified instruction segments to associated C3 instructions, the output of the conversion procedure is passed to the adaptive microware compilation, this adaptive back-end software transformation procedure to replace the qualified instruction segments with the C3 instructions formatted and bound by the adaptive microware compilation and to reorder the entire instructions with the new addresses calculated; and an adaptive back-end software transformation procedure replaces the qualified instruction segments with the C3 instructions formatted and bound by the adaptive microware compilation and reorders the entire instructions with the new addresses calculated, this adaptive binary object code generation procedure to produce the final adaptive binary object code if the branch-trimming and instruction grouping qualification procedure cannot find any qualified instruction segments for the BTIG operation and refer to the adaptive ISA composed during the adaptive configware compilation; repeat all of the compilation procedures including micro-architecture interactive compilation, adaptive microware and adaptive configware compilations, to finally produce an adaptive binary object code with generated intermediate outputs including the adaptive ISA from the adaptive configware compilation and the adaptive microware code from the adaptive microware compilation; and continue the recursive compilation until no qualified instruction segment is found or terminate at the end of each adaptive back-end software compilation cycle.

17. The apparatus of claim 15 the adaptive microwave compilation to:

perform a mandatory adaptive microware code generation procedure to generate two types of adaptive microware code outputs, which include (1) micro-operation sequences and pre-decoded information of the C3 instructions by formatting and binding the C3 instructions to the micro-operations already implemented in the target back-end processing engines and (2) hierarchical instruction binding information that links the C3 instructions to the micro-operations of the instructions in the grouped instructions, and to generate (3) the instruction binding information of the non-grouped instructions; and perform an optional microware compilation procedure so that the C3 instructions are further processed for improving the adaptive microprocessor performance by rearranging the execution order of the micro-operations of the C3 instructions for the parallel execution at the micro-operation level, reordering the micro-operations based on the dataflow of the internal micro-operations of the C3 instructions for eliminating unnecessary micro-operations related to temporary data store and load operations, and resolving dependency at the micro-operation level; This microware optimization procedure to:

improve the adaptive microprocessor performance;

rearrange the execution order of the micro-operations of the C3 instructions for parallel execution at the micro-operation level;

reorder the micro-operations based on the dataflow of the internal micro-operations of the C3 instructions;

eliminate unnecessary micro-operations related to temporary data store and load operations; and perform dependency resolution operations at the micro-operation level.

18. The apparatus of claim 15 the adaptive configware compilation to:

perform an adaptive instruction set architecture (ISA) composition procedure to:

compose a C3 instruction set as a part of the adaptive ISA including C3 instruction format, branch-trimmed and/or grouped instruction sequences, and others, on the C3 instructions generated by the last procedure of the adaptive back-end software compilation;

produce the branch-trimmed and/or grouped instructions as C3 instructions that are completely hidden from the application programmers who generally use only the software compiler for software code protection and compression; and collect non-grouped instructions from the original target ISA and encompass them to the C3 instruction set composed. This procedure is for configuring the adaptive instruction decoder to decode entire non-grouped and grouped instructions and utilizing the original ISA and the adaptive ISA for decoding non-grouped and grouped (e.g., C3) instructions, respectively; and perform an adaptive configware code generation procedure to produce configuration code for the adaptive instruction decoder. This adaptive configware code concurrently executes when the adaptive instruction decoder decodes instructions, especially for identifying the C3 instructions.

19. The apparatus of claim 15 the micro-operations to bind instructions defined ISA to back-end processing engines as detailed low-level instructions for implementing complex machine instructions.

* * * * *